(12) United States Patent
Deflaux et al.

(10) Patent No.: US 10,438,152 B1
(45) Date of Patent: Oct. 8, 2019

(54) MANAGING PERFORMANCE OF HUMAN REVIEW OF MEDIA DATA

(75) Inventors: Nicole A. Deflaux, Seattle, WA (US); James R. Blair, Seattle, WA (US); Jang Han Goo, Seattle, WA (US); Mark Chien, Bellevue, WA (US); Luis Felipe Cabrera, Bellevue, WA (US); Mohamed Reza Hussein, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2076 days.

(21) Appl. No.: 12/020,469

(22) Filed: Jan. 25, 2008

(51) Int. Cl.
*G06Q 10/06* (2012.01)
*G06Q 10/10* (2012.01)
*G06F 16/387* (2019.01)
*G06F 16/9537* (2019.01)
*G06F 16/29* (2019.01)

(52) U.S. Cl.
CPC . *G06Q 10/06316* (2013.01); *G06Q 10/06398* (2013.01); *G06Q 10/101* (2013.01); *G06Q 10/103* (2013.01); *G06F 16/29* (2019.01); *G06F 16/387* (2019.01); *G06F 16/9537* (2019.01); *G06K 2209/27* (2013.01)

(58) Field of Classification Search
None
See application file for complete search history.

(56) References Cited

U.S. PATENT DOCUMENTS

| | | | |
|---|---|---|---|
| 5,455,875 A | 10/1995 | Chevion et al. | 382/311 |
| 5,465,308 A | 11/1995 | Hutcheson et al. | 382/159 |
| 5,805,745 A | 9/1998 | Graf | 382/291 |
| 5,826,244 A | 10/1998 | Huberman | 705/37 |
| 5,848,393 A | 12/1998 | Goodridge et al. | 705/8 |
| 5,862,223 A | 1/1999 | Walker et al. | 380/25 |
| 5,937,388 A | 8/1999 | Davis et al. | 705/8 |
| 6,012,066 A | 1/2000 | Discount et al. | 707/103 |
| 6,032,151 A | 2/2000 | Arnold et al. | 707/103 |

(Continued)

OTHER PUBLICATIONS

Von Ahn,"Human Computation," Dec. 7, 2005, Thesis, retrieved from Carnegie Mellon at http://reports-archive.adm.cs.cmu.edu/anon/anon/usr/ftp/2005/CMU-CS-05-193.pdf.*

(Continued)

*Primary Examiner* — Ivan R Goldberg
(74) *Attorney, Agent, or Firm* — Nicholson De Vos Webster & Elliott, LLP

(57) ABSTRACT

Techniques are described for facilitating performance of tasks involving human review of media data (e.g., images, audio clips, video clips, etc.), such as to identify one or more targets of interest. The media data review may be performed for various reasons, such as to assist in locating one or more target objects in a large geographical area (e.g., one or more missing people or vehicles) based on human review of large quantities of images that each correspond to a small subset of the geographical area. When one or more of the reviewed media data pieces are identified as being relevant, information about those identified media data pieces may be used in various ways. Furthermore, in at least some situations, the media data review may be part of a charitable effort that uses human volunteers to review the media data without monetary payment or other compensation.

20 Claims, 8 Drawing Sheets

(56) References Cited

U.S. PATENT DOCUMENTS

| | | | |
|---|---|---|---|
| 6,041,306 A | 3/2000 | Du et al. | 705/8 |
| 6,044,355 A | 3/2000 | Crockett et al. | 705/8 |
| 6,078,916 A | 6/2000 | Culliss | 707/5 |
| 6,128,380 A | 10/2000 | Shaffer et al. | 379/265 |
| 6,163,607 A | 12/2000 | Bogart et al. | 379/266 |
| 6,173,053 B1 | 1/2001 | Bogart et al. | 379/266 |
| 6,181,343 B1 | 1/2001 | Lyons | 345/358 |
| 6,182,068 B1 | 1/2001 | Culliss | 707/5 |
| 6,223,165 B1 | 4/2001 | Lauffer | 705/8 |
| 6,393,497 B1 | 5/2002 | Arnold et al. | 709/330 |
| 6,539,377 B1 | 3/2003 | Culliss | 707/5 |
| 6,546,087 B2 | 4/2003 | Shaffer et al. | 379/90.01 |
| 6,584,192 B1 | 6/2003 | Agusta | 379/265.12 |
| 6,584,464 B1 | 6/2003 | Warthen | 707/4 |
| 6,587,556 B1 | 7/2003 | Judkins et al. | 379/219 |
| 6,603,854 B1 | 8/2003 | Judkins et al. | 379/265.06 |
| 6,636,590 B1 | 10/2003 | Jacob et al. | 379/114.05 |
| 6,704,403 B2 | 3/2004 | Lurie et al. | 379/114.1 |
| 6,707,904 B1 | 3/2004 | Judkins et al. | 379/265.06 |
| 6,763,104 B1 | 7/2004 | Judkins et al. | 379/265 |
| 6,859,523 B1 | 2/2005 | Jilk et al. | 379/32.01 |
| 6,938,048 B1 | 8/2005 | Jilk et al. | 707/102 |
| 7,155,400 B1 | 12/2006 | Jilk et al. | 705/9 |
| 7,197,459 B1 | 3/2007 | Harinarayan et al. | 704/270.1 |
| 8,347,295 B1* | 1/2013 | Robertson et al. | 718/103 |
| 8,539,493 B1* | 9/2013 | Robertson et al. | 718/103 |
| 2002/0069079 A1 | 6/2002 | Vega | 705/1 |
| 2002/0083079 A1 | 6/2002 | Meier et al. | 707/104.1 |
| 2003/0078852 A1 | 4/2003 | Shoen et al. | 705/26 |
| 2003/0187664 A1* | 10/2003 | Bonebrake | 705/1 |
| 2003/0198364 A1* | 10/2003 | Yonover et al. | 382/101 |
| 2003/0200156 A1 | 10/2003 | Roseman et al. | 705/27 |
| 2003/0204449 A1 | 10/2003 | Kotas et al. | 705/27 |
| 2004/0213437 A1* | 10/2004 | Howard et al. | 382/115 |
| 2004/0267740 A1* | 12/2004 | Liu et al. | 707/3 |
| 2005/0197749 A1* | 9/2005 | Nichols et al. | 701/3 |
| 2006/0106675 A1* | 5/2006 | Cohen et al. | 705/26 |
| 2006/0106774 A1 | 5/2006 | Cohen et al. | 707/3 |
| 2006/0149613 A1* | 7/2006 | Younger | 705/9 |
| 2007/0162761 A1* | 7/2007 | Davis et al. | 713/182 |
| 2007/0173699 A1* | 7/2007 | Mathan et al. | 600/300 |
| 2007/0174872 A1* | 7/2007 | Jing et al. | 725/46 |
| 2008/0010273 A1* | 1/2008 | Frank | 707/5 |
| 2008/0010605 A1* | 1/2008 | Frank | 715/765 |
| 2008/0069480 A1* | 3/2008 | Aarabi et al. | 382/305 |
| 2008/0126343 A1* | 5/2008 | Frank et al. | 707/5 |

OTHER PUBLICATIONS

Surowiecki, "The Wisdom of Crowds," 2005, Random House.*
Merriam-Webster, "Merriam-Webster's Collegiate Dictionary," Eleventh Edition, 2004, p. 208.*
Surowiecki, "The Wisdom of Crowds," 2005, Random House, pp. 8-10.*
U.S. Appl. No. 10/990,771, filed Nov. 16, 2004, Mortensen et al.
U.S. Appl. No. 10/991,339, filed Nov. 16, 2004, Cohen et al.
"About Spending," retrieved Nov. 23, 2004, from http://www.mypoints.com/mp/dstatial.show?isref=nmhp.popup.aboutspending.default, 1 page.
"Earning Points with MyPoints," retrieved Nov. 23, 2004, from http://www.mypoints.com/mp/dstatial.show?isref=nmhp.popup.aboutearning.default, 1 page.
"FAQs," retrieved Nov. 23, 2004, from http://www.mypoints.com/mp/dstatial.show?isref=nmhp.popup.faq.default, 1 page.
"Frequently Asked Questions about the Open Mind Initiative," retrieved Nov. 16, 2004, from http://www.openmind.org/FAQs.html, pp. 1-3.
"Frequently Asked Questions," TrueDater FAQ's, retrieved Apr. 4, 2005, from http://www.truedater.com/index.php?action=faqs, pp. 1-2.
"Grid—The Competitive Advantage," Aug. 2004, retrieved Jun. 9, 2005, from http://www.sun.com/solutions/documents/articles/grid_adv_aa.xml?null, pp. 1-2.
"Join MyPoints Now," retrieved Nov. 23, 2004, from http://www.mypoints.com/?MCK=ccb67d8c41a3819b, pp. 1-4.
"Payment-On-Line (AOL, Compuserve, Internet, etc)," Oct. 20, 1994, retrieved Dec. 6, 2004, from http://groups-beta.google.com/group/misc.entrepreneurs/browse_thread/thread/80fcf110252bb3f7/ff1c8, pp. 1-3.
"The ESP Game," retrieved Jun. 8, 2005, from http://www.espgame.org, 1 page.
"What is BonusMail®?," retrieved Nov. 23, 2004, from http://www.mypoints.com/mp/dstatial.show?isref=nmhp.popup.bonusmail.default, 1 page.
"What is Keen," retrieved Jun. 8, 2005, from http://www.keen.com/documents/homepage/wik_pop.asp?TID=gbFQnFLPstnUuFonMtBmHw, 1 page.
"What is MyPoints," retrieved Nov. 23, 2004, from http://www.mypoints.com/mp/dstatial.show?isref=nmhp.popup.whatis.default, 1 page.
About, Inc., "Intelligent Agents," retrieved Jun. 9, 2005, from http://psychology.about.com./od/intelligentagents/, pp. 1-5.
About, Inc., "Our Story," retrieved Jun. 9, 2005, from http://ourstory.about.com/, pp. 1-2.
About, Inc., Welcome to About.com, retrieved Jun. 9, 2005, from http://www.about.com, pp. 1-2.
Applied Skills & Knowledge, LLC, "Make Skills-Based Routing Happen," Jun. 3, 2003, retrieved from http://www.appliedskills.com/whitepapers/files/Skills-basedRouting.pdf, 3 pages.
Barlas, D., "Hipbone Connects to Kana," Jan. 5, 2004, retrieved Jun. 8, 2005, from http://www.line56.com/print/default.asp?ArticleID=5255, 1 page.
Calishain, T., "Yahoo! Service Offers More Advice than Expertise," May 6, 2002, retrieved Jul. 16, 2004, from http://www.infotoday.com/newsbreaks/nb020506-1.htm, pp. 1-2.
distributed.net, "distributed.net History & Timeline," retrieved Jun. 8, 2005, from http://www.distributed.net/history.php, pp. 1-7.
distributed.net, "The Organization," retrieved Jun. 8, 2005, from http://www.distributed.net/, pp. 1-2.
Doan, A., "MongoMusic Fans Include Microsoft," Sep. 9, 2000, retrieved Jun. 9, 2005, from http://www.forbes.com/2000/09/09/feat2.html, pp. 1-3.
Dubaud, S., "Advice Site Resort to Legal Counsel," Jan. 4, 2002, retrieved Apr. 29, 2004, from http://news.com.com/2011-1088-801359.html, pp. 1-3.
Elance Inc., Elance Online™—Everyday Outsourcing™, retrieved Jun. 9, 2005, from http://www.elance.com/c/static/main/displayhtml.pl?file=eol.html&module=home, pp. 1-2.
Elance, Inc., "Elance History," retrieved Jun. 8, 2005, from http://www.elance.com/c/static/main/displayhtml.pl?file=heritage.html, pp. 1-3.
ELancer homepage, retrieved Jun. 8, 2005, from http://www.elancer.us/, pp. 1-2.
Epinions, Inc., Epinions.com homepage, retrieved Jun. 9, 2005, from http://www.epinions.com, pp. 1-2.
Fox, S., "Can New Technology Revolutionize the Net?," Jun. 1, 2000, retrieved Jun. 8, 2005, from http://web.archive.org/web/20001018221958/www.cnet.com/insider/0-121949-7-1995365.html, pp. 1-3.
Get a Freelancer.com homepage, Innovate it, retrieved Jun. 9, 2005, from http://www.getafreelancer.com, pp. 1-3.
gonesilent.com homepage, Aug. 22, 2000, retrieved Jun. 8, 2005, from http://web.archive.org/web/20000822122731/www.gonesilent.com/about.html, pp. 1-2.
Google, "Ask a question, Set your Price. Get your Answer.," retrieved Jun. 9, 2005, from http://answers.google.com/answers/, 1 page.
Google, "Your Computer's Idle Time is too Precious to Waste," retrieved Jun. 9, 2005, from http://toolbar.google.com/dc/offerdc.html, 1 page.
Gunn, S., "Hey, buddy, can you spare some cycles?," Sep. 24, 1997, retrieved Jun. 8, 2005, from http://www.cnn.com/TECH/9709/24/netly.news/, pp. 1-4.
Hagel, J. et al., "Go Slowly with Web Services," Feb. 15, 2002, retrieved from http://www.cio.com/archive/021502/keynote.html, 4 pages.

(56) References Cited

OTHER PUBLICATIONS

Hagel, J., et al., "Your Next IT Strategy," *Harvard Business Review RO109G*:105-113, Oct. 2001.
Hagel, J., *Out of the Box—Strategies for Achieving Profits today and Growth Through Web Services*, Harvard Business School Publishing, Boston, Massachusetts, 2002, Front Cover through Acknowledgements, Chapter 1, "Responding to Unmet Needs," and Chapter 2, "Web Services Create New Options," pp. i-xix and 1-42, 33 pages.
Ingenio, Inc., Ingenio™ homepage, retrieved Jun. 8, 2005, from http://www.ingenio.com/default.asp?TF=1, pp. 1-2.
Ingenio, Inc., Introducing Ingenio™ Pay Per Call™, retrieved Jun. 8, 2005, from http://www.ingenio.com/documents/corp/home.asp, pp. 1-2.
Ingenio, Inc., KEEN—Your Personal Advisor, retrieved Jun. 8, 2005, from http://www.keen.com, pp. 1-2.
Ingenio, Inc., KEEN—Your Personal Advisor/Get Advice, retrieved Jun. 8, 2005, from http://www.keen.com/categories/get_answers.asp?SRCHT=0&search=&gid=0, 1 page.
Jupitermedia Corporation, "About jGuru.com: Overview," retrieved Jun. 9, 2005, from http://www.jguru.com/misc/about-overview.jsp, pp. 1-2.
Jupitermedia Corportion, jGuru homepage, retrieved Jun. 9, 2005, from http://www.jguru.com, pp. 1-5.
KANA Inc., "Corporate Overview," retrieved Jun. 8, 2005, from http://www.kana.com/about/about.aspx, pp. 1-2.
Katz, J., et al., "The Benefits of a Virtual Contact Center," MCI, Inc., May 2004, retrieved from http://global.mci.com/us/enterprise/insight/whitepapers/pdf/VirtualContactCtr.pdf, 7 pages.
Kenexa, "Call Centers," retrieved Jun. 8, 2005, from http://www.kenexa.com/ind_callcent.html, pp. 1-3.
Lynn, R., "Keeping Online Daters Honest," Apr. 1, 2005, retrieved on Apr. 4, 2005, from http://www.wired.com/news/print/0,1294,67083,00.html, pp. 1-3.
Massive Multiplayer Online Role-Playing Game—homepage, retrieved Jun. 8, 2005, from http://www.mpog.com, pp. 1-2.
Microsoft Corporation, "Microsoft Acquires MongoMusic," Sep. 13, 2000, retrieved Jun. 9, 2005, from http://www.microsoft.com/presspass/press/2000/sept00/mongopr.mspx, pp. 1-2.
Mori, G., et al., "Breaking a Visual CAPTCHA," retrieved Jun. 8, 2005, from http://www.cs.berkeley.edu/~mori/gimpy/gimpy.html, pp. 1-4.
Mossberg, W., "GuruNet as a Reference Tool Goes Beyond Search Engines," Mar. 6, 2003, retrieved Jul. 20, 2004, from http://www.ptech.wsj.com/archive/ptech-20030306.html, pp. 1-3.
Multiplayer Online Games Directory—homepage, retrieved Jun. 8, 2005, from http://www.mpogd.com, 1 page.
Nortel Networks, "Beyond ACD—The advantages of Skill-based Routing in Today's Contact Centers," Mar. 7, 2003, retrieved from http://www.nortelnetworks.com/solutions/ccvp/collateral/nn103640-030703.pdf, 12 pages.
Online Multiplayer Games Network—homepage, retrieved Jun. 8, 2005, from http://www.omgn.com, pp. 1-2.
Project Gutenberg's Distributed Proofreaders—homepage, retrieved Jun. 9, 2005 from http://www.pgdp.net/c/default.php, pp. 1-4.
Rhodes, B., "The Wearable Remembrance Agent: A System for Augmented Memory," Appeared in *Personal Technologies Journal Special Issue on Wearable Computing 1*:218-224, 1997, retrieved Jun. 9, 2005, from http://www.bradleyrhodes.com/Papers/wear-ra-personaltech/, 10 pages.
SERENA Software, Inc., "Serena™ Automating Change," retrieved Jun. 9, 2005, from http://www.serena.com, 1 page.
SETI Institute homepage, retrieved Jun. 9, 2005, from http://www.seti.org/site/pp.asp?c=kt2J9MMIsE&b=178025, pp. 1-3.
Siebel Systems, Inc., Siebel homepage, retrieved Jun. 8, 2005, from http://www.siebel.com/, pp. 1-3.
Singh, P., "Open Mind: common sense—Teaching computers the stuff we all know," retrieved Jun. 9, 2005, from http://commonsense.media.mit.edu/cgi-bin/search.cgi, pp. 1-2.
Singh, P., "The Open Mind Common Sense Project," Jan. 2, 2002, retrieved Jun. 9, 2005, from http://www.kurzweilai.net/articles/art0371.html, pp. 1-24.
Spice, B., "CMU Student Taps Brain's Game Skills," Oct. 5, 2003, retrieved Jun. 8, 2005, from http://www.post-gazette.com/pg/03278/228349.stm, pp. 1-5.
Spogg.com—homepage, retrieved Jun. 8, 2005, from http://www.spogg.com, pp. 1-2.
Sun Microsystems, Inc., "Products & Technologies—Java Technology," retrieved Jun. 9, 2005, from http://java.sun.com, pp. 1-2.
Sun Microsystems, Inc., "The Jini Technology Series: JavaSpaces Principles, Patterns, and Practice," retrieved Jun. 9, 2005, from http://java.sun.com/docs/books/jini/javaspaces/, pp. 1-2.
TopCoder, Inc., TOPCODER homepage, retrieved Jun. 8, 2005, from http://www.topcoder.com/, pp. 1-2.
University of California, "What is SETI@home?," retrieved Jun. 9, 2005, from http://setiathome.ssl.berkeley.edul, 1 page.
Wilson, B. "Anti-Social Software," Apr. 30, 2004, retrieved Aug. 26, 2005, from http://www.brendonwilson.com/profile/000156.shtml, 5 pages.
Wolverton, T., et al., "Yahoo Launches Advice Site," Apr. 29, 2002, retrieved Apr. 29, 2004, from http://news.com.com/2102-1017_3-894968.html?tag+st.util.print, pp. 1-2.
Texas Governor Rick Perry—Press Release, "Perry Authorizes More Border Security Funding, Virtual Border Watch Program," Jun. 1, 2006, retrieved Jan. 15, 2008, from http://www.governor.state.tx.us/divisions/press/pressreleases/PressRelease.2006-06-01.1612, 2 pages.
MacManus, R., "Still No Killer Apps for Amazon Mechanical Turk," Jan. 11, 2007, retrieved Jan. 16, 2008, from http://www.readwriteweb.com/archives/mechanical_turk_still_no_killer_app.php., 4 pages.
Hof, R., "Amazon's Mechanical Turk," BusinessWeek, Tech Beat, Nov. 4, 2005, retrieved Jan. 16, 2008, from http://www.businessweek.com/the_thread/techbeat/archives/2005/11/amazons_mechani.html, 7 pages.
VBulletinSetup, "Google Asks Surfers for Help," Sep. 6, 2006, retrieved Jan. 16, 2008, from http://forum.vbulletinsetup.com/f10/google-asks-surfers-help-254-print.html, 2 pages.
Silberman, S., "Inside the High Tech Hunt for a Missing Silicon Valley Legend," Wired, Jul. 24, 2007, retrived Jan. 25, 2008, from http://www.wired.com/print/techbiz/people/magazine/15-08/ff_jimgray, 11 pages.

* cited by examiner

|  202  |  204  |  206  |
|---|---|---|
| My Home | Tasks | Qualifications |

240

Status: assigned  
Timer: 00:23 of 6:00   } 242

244 { Earned Today: $3.40  
Tasks Submitted: 24

Task Details: — 246a  
 Requester: EEE  
 Expiration: 6/29/XX at 3pm  
 Reward: $0.00

Task Description: — 246b

To complete this task, please indicate whether the review image contains a target ABC similar to the example target in the example image. More details...

Target Identification Performance:

Review this image — 246c

Example image with similar target — 246d

○ Yes, this image appears to contain the target or something similar to it  
○ No, this image does not contain the target } 246e Please provide additional comments here: — 246f

[ Submit Task ] — 248a         [ Cancel ] — 248b

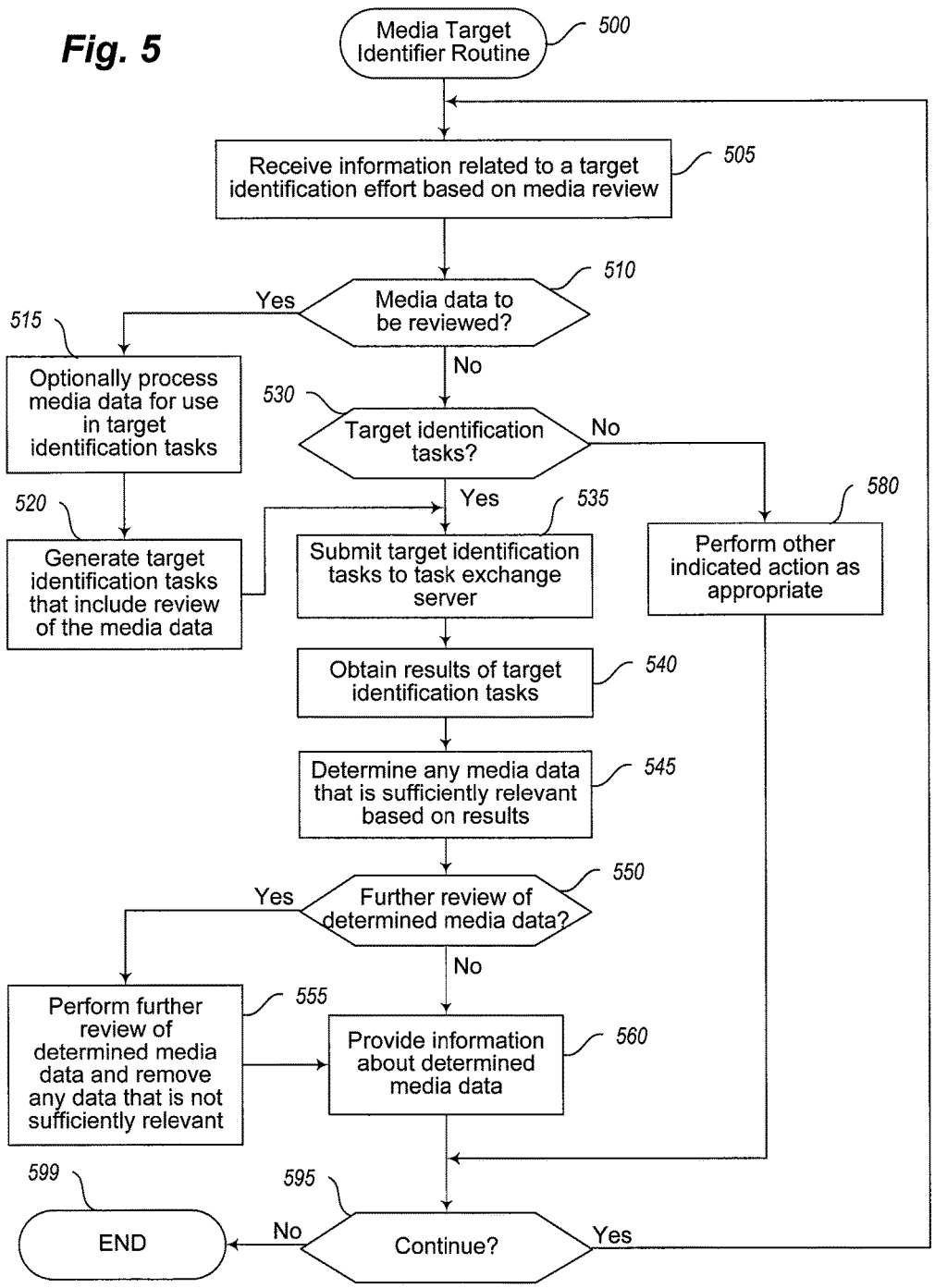

MANAGING PERFORMANCE OF HUMAN REVIEW OF MEDIA DATA

TECHNICAL FIELD

The following disclosure relates generally to facilitating tasks involving human review of media data to identify targets of interest.

BACKGROUND

The Internet comprises a vast number of computers and computer networks that are interconnected through communication links, with information being exchanged using various services such as electronic mail and the World Wide Web (also referred to as the "Web"). In addition to providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

In addition to such Web-based interactions between computers (e.g., interactions initiated by users using Web browser applications to interactively request Web pages from Web servers), various distributed computing systems are known in which multiple computer systems interact in other manners in order to achieve a goal. For example it is often desirable for an application program on a computer system to interact with remote systems and applications in order to obtain various types of information and functionality that are not part of the application program. By performing such interactions, an application program may be able to leverage information and functionality from vast numbers of other computer systems over the Internet or other networks. In order to enable such interactions between remote computer systems and application programs, various programmatic interaction mechanisms have been developed. For example, remote procedure call ("RPC") protocols have long existed that allow a program on one computer to cause a program on another computer to be executed, and various object-oriented and other architectures such as CORBA ("Common Object Request Broker Architecture"), Java RMI ("Remote Method Invocation"), JavaSpaces, Jini, JXTA, UPnP ("Universal Plug and Play") and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the Web has also provided additional opportunities for computers to inter-communicate in various programmatic manners. For example, there is growing use of the Web to provide so-called "Web services," which typically involve the programmatic interaction of remote applications to exchange information via defined APIs ("application program interfaces"), or the like. Web services may allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Web services and other programmatic interaction mechanisms allow various application programs and computers to interact, but such interactions are typically limited in various ways. For example, the types of information and functionality that are available to be requested using such programmatic interactions are typically restricted to very limited types of requests that the remote computer systems and applications can automatically fulfill (e.g., to provide a specified predefined group of information, such as a Web page or file, or to perform a specified database query on a specified database). Moreover, there is a very large class of tasks which computers and application programs cannot easily automatically perform, but which humans can typically easily perform, referred to herein as "human performance tasks." This is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking. However, it is typically difficult to obtain efficient performance of such human performance tasks.

BRIEF DESCRIPTION OF THE DRAWINGS

FIGS. 2A-2C illustrate examples of media target identification tasks for performance by human task performers.

FIG. 5 is a flow diagram of an example embodiment of a Media Target Identifier routine.

DETAILED DESCRIPTION

Figure 1:
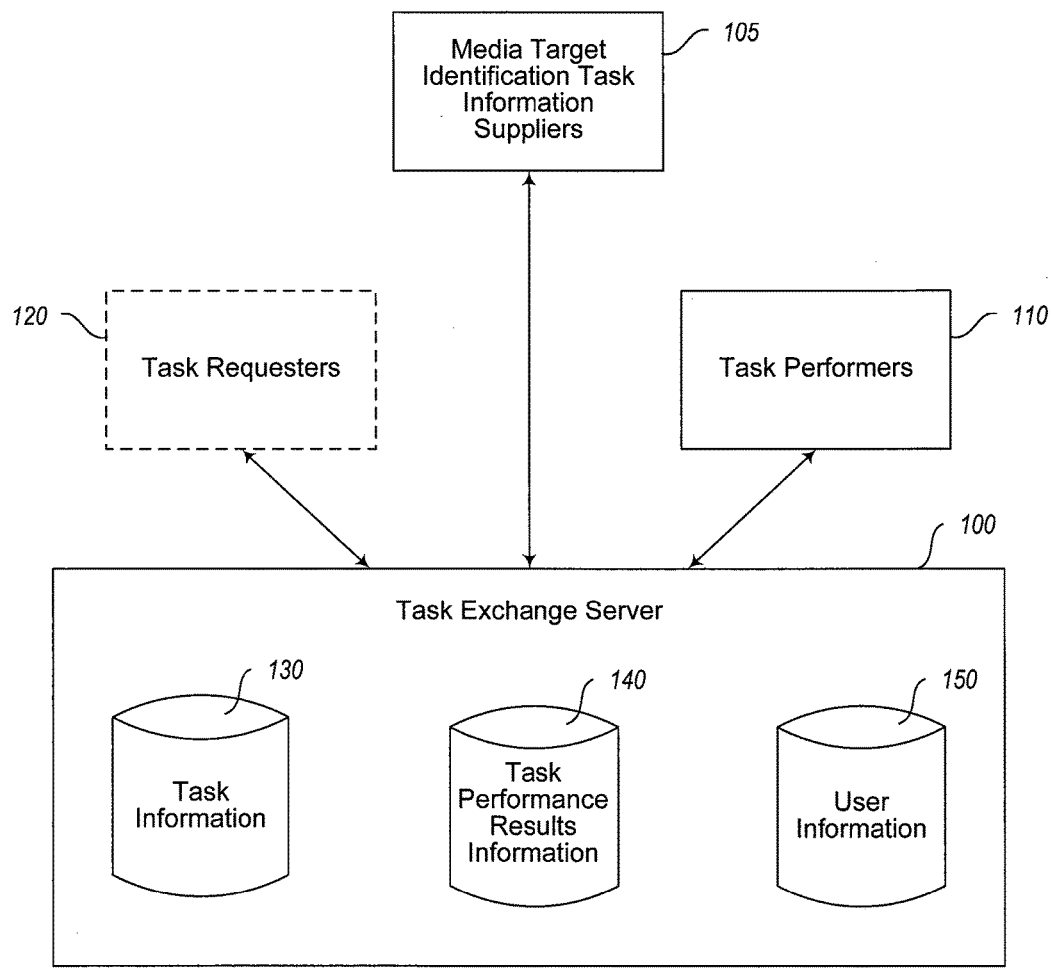
FIG. 1 is a block diagram illustrating an example embodiment of a system that facilitates identification of targets in media by human task performers.

Techniques are described for facilitating tasks involving human review of media data. In at least some embodiments and situations, the human review of the media data is performed by multiple humans in order to identify one or more targets of interest in particular pieces of the media data, such as in particular images, audio clips, video clips, etc. In particular, a group of multiple related tasks may be created that each include one or more media data pieces to be reviewed, with the multiple tasks made available to various human users for performance. The targets of interest may have various forms in various situations, such as particular people or other objects in image media data or video media data, particular sounds in audio media data, etc. Furthermore, the media data pieces to be reviewed by the humans as part of the tasks may be selected or generated in various ways in various embodiments, such as to facilitate review of each media data piece or associated task in a desired manner (e.g., within a predetermined amount of time). In at least some embodiments, a media task identifier system automatically performs at least some of the described techniques so as to coordinate performance of groups of related tasks.

The human review of media data to identify targets of interest may be performed in various manners and for various reasons in various embodiments. As one specific example, in some situations it may be beneficial to locate one or more target objects in a physical area, such as a large geographical area (e.g., one or more missing people or vehicles in a large search area), and large quantities of images may be obtained that each correspond to one or multiple physical locations in the physical area or otherwise to a small subset of the geographical area. In such situations, individual tasks may each include one or more images that are reviewable by a human within a predetermined amount of time (e.g., seconds or minutes) to determine whether the target objects appear to be present in the reviewed images. When one or more of the reviewed images are identified as being sufficiently likely to include at least one of the target objects (e.g., based on being independently selected by at least a predefined quantity of multiple distinct humans), information about those identified images may be used in various ways, such as to target or focus further search in the geographical area subsets that correspond to those identified images. In addition to identifying locations of target objects in a geographical area, the target objects could be identified in any other type of physical location. For example, the images may represent two or three-dimensional images of at least a portion of a physical object (e.g., medical images of a human body). The images may correspond to portions of outer-space or may even be magnified images of an object. In one example, the images may represent, for example, highly-magnified images that collectively represent portions of an integrated circuit being examined for a defect, such as a particle contamination defect, a pattern alignment problem, etc. In this respect, it should be understood that the size of the area to be reviewed may be at least partially determined by the resolution of the images or other media data pieces to be examined, and may be at least partially determined by the targets of interest and possible physical locations of those targets.

In some embodiments, the media task identifier system may coordinate the performance of tasks involving human review of media data to identify targets (also referred to herein as "media target identification tasks") by interacting with one or more external task exchange server systems via which the tasks are performed, while in other embodiments the media task identifier system may instead directly interact with multiple human users to effect the performance of media target identification tasks (e.g., if the media task identifier system is integrated with or otherwise associated with a task exchange server system). Such task exchange server systems (also referred to as a "task exchange server" and "task exchange system") may, for example, facilitate interactions between task requesters who have tasks available to be performed and task performer users who are available to perform tasks, such as interactions that involve human task performer users performing tasks supplied by task requesters. In at least some embodiments, at least some of the tasks to be performed via such task exchange server systems are human performance tasks that use cognitive and other mental skills of human task performer users, such as to employ judgment, perception and/or reasoning skills of the human task performer users. Furthermore, in at least some embodiments, at least some tasks may be fee-based tasks that each have an associated fee to be paid to one or more task performer users for successful performance of the task, and at least some tasks may further have various restrictions and other criteria associated with performance of the task (e.g., preferred or required qualifications of human task performer users who perform the task).

Furthermore, in at least some embodiments, the human performance of tasks to review a particular group of images or other media data in order to identify targets of interest may be performed without compensation from a task requester, the task exchange system, or the media target identifier system to the task performer users. For example, among many other possibilities, embodiments may be used as part of a charitable effort to identify the targets, such as by using humans who volunteer to review the media data without monetary payment or other compensation. In addition, in at least some such embodiments, the media task identifier system and/or task exchange server system may perform some or all of their coordination of the performance of such non-fee-based volunteer tasks without payment from a task requester or other organizer of the target identification effort, such as if they do not receive any revenue for the coordination of the performance of the non-fee-based tasks. Alternatively, in some embodiments, compensation may be provided to one or more of an operator of the media task identifier system, operator of the task exchange system, task performer users, and/or task requesters, such as through advertising revenue from presenting advertisements to the humans who perform the non-fee-based tasks (e.g., as opposed to, for example, payments flowing from a task requester to task performer users and/or to the media task identifier system).

Thus, in at least some embodiments, an electronic task exchange server system acts as an intermediary to allow task requesters and task performer users to interact, and facilitates the performance of media target identification tasks by human task performer users. In particular, in some embodiments, one or more computing systems providing the task exchange server system act as an intermediary to allow task requesters to programmatically request (e.g., via programmatic invocations of one or more APIs of the task exchange server system by application programs of the task requesters) that tasks be performed by human task performers and to receive corresponding results after the tasks are performed (e.g., as responses to the programmatic invocations), thus providing a form of artificial artificial intelligence to task requesters' application programs. Similarly, human task performer users may access the task exchange server system (e.g., in a programmatic or interactive manner) to obtain information about available tasks that they may perform and to provide the results of task performance after the completion of tasks that they are assigned. By enabling large numbers of unaffiliated or otherwise unrelated task requesters and task performers to interact via the intermediary task exchange system in this manner, free-market mechanisms mediated by the Internet or other public computer networks may be used to programmatically harness the collective intelligence of a mutable ensemble of unrelated human task performers. Additional details related to the function and operation of various embodiments of task exchange server systems, such as a task fulfillment facilitator system embodiment, are included in pending commonly-owned U.S. patent application Ser. No. 10/990,949, filed Nov. 16, 2004 and entitled "Providing an Electronic Marketplace to Facilitate Human Performance of Programmatically Submitted Tasks;" in U.S. patent application Ser. No. 11/334,773, filed Jan. 17, 2006 and entitled "Performing Automated Price Determination For Tasks To Be Performed;" and in U.S. patent application Ser. No. 11/842,730, filed Aug. 21, 2007 and entitled "Transferring Entity-Related Data Between Storage Partitions;" each of which is hereby incorporated by reference in its entirety.

FIG. 1 is a block diagram illustrating an example of users interacting with a remote system that stores various data and provides various types of functionality, with embodiments of such a system able to use various of the described techniques for automatically facilitating performance of media target identification tasks by human users. In particular, in this example, the system storing the data is a task exchange server system 100 that provides functionality related to human performance of tasks, such as by managing data related to tasks and to users who supply and/or perform the tasks. For illustrative purposes, some embodiments are described herein in which specific types of users interact with specific types of systems in specific ways, and in which the systems store specific types of data and provide specific types of related functionality, including specific types of techniques for the controlled release of tasks to be performed by task performer users. For example, in the illustrated embodiment, the task exchange server system 100 includes functionality of a media task identifier system to coordinate the performance of media target identification tasks, although in other embodiments one or more separate media task identifier systems may perform such techniques, whether alone or in conjunction with one or more task exchange server systems. These examples are provided for illustrative purposes and are simplified for the sake of brevity, and the techniques disclosed herein can be used in a wide variety of other situations, some of which are described herein.

The task exchange server system 100 may be implemented in various ways in various embodiments, such as in the form of a software system executing on one or more computing systems or devices (e.g., in a distributed manner, such as on a peer-to-peer or grid network). Furthermore, while not illustrated in this example embodiment, in some embodiments data may be stored across multiple alternative storage partitions on multiple alternative computing nodes, such that at least some types of data are stored only on a single partition. For example embodiment, data within the system 100 may be organized based on users with which the data is currently associated, so as to store a group of data related to a particular user together on a particular storage partition, and with each user being associated with one of the alternative computing nodes whose storage partition stores data for the user. The associated alternative computing node for a user may further provide at least some of the functionality of the system 100 to the user, such as to process and respond to various types of requests received from the user. In addition, the types of tasks to be performed may have various forms in various embodiments. For example, there is a large class of tasks which computers and application programs cannot easily automatically perform, but which humans can typically easily perform, referred to herein as "human performance tasks." In at least some embodiments, the task exchange server 100 may facilitate the submission and performance of such human performance tasks. The ability of humans to perform such tasks is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking. In addition, related tasks may in some embodiments be grouped together or otherwise handled in a consistent manner, such as a group of multiple media target identification tasks that are part of a single target identification effort.

In the example of FIG. 1, the task exchange server 100 includes a task information data repository 130, task performance results information data repository 140, and a user information data repository 150. In this example, various users or other entities 105 may supply information about media target identification tasks that are available to be performed by task performer users 110, so as to obtain human review of pieces of media data that are part of the media target identification tasks. In some embodiments, the entities 105 may include one or more external media target identifier systems that supply media target identification tasks to be performed via the task exchange server 100 and that otherwise coordinate performance of those media target identification tasks as part of a media target identification effort, although in the illustrated embodiment the task exchange server 100 includes a media task identifier system functionality and interacts with external users that provide information related to such media target identification efforts. For example, in some embodiments an external user 105 may supply large amounts of media data related to a media target identification effort, and the task exchange server 100 may perform various processing of the media data in order to generate appropriate media target identification tasks for the effort that each include review of a portion or subset of the supplied media data. Alternatively, an external user 105 may instead provide information about where or how such media data is externally available, and the task exchange server 100 may retrieve such media data before processing it. In other situations, an external user 105 may itself process media data to be reviewed and supply a group of multiple related media target identification tasks to the task exchange server 100.

Optionally, various task requesters 120 may similarly interact with the task exchange server 100 in order to supply various types of tasks that are available to be performed by task performer users 110, as well as to perform other related activities, although in some embodiments only media target identification tasks may be allowed if the task exchange server is acting as a dedicated media task identifier system.

In the illustrated example, in addition to supplying tasks, a task requester 120 may interact with the task exchange server 100 to obtain results from the performance by one or more task performer users 110 of previously supplied tasks, to obtain information about an account of the task requester (e.g., information about financial payments made to other users for performing fee-based tasks supplied by the task requester, information about previously specified preferences, etc.), to search for information about tasks and/or about task performer users who are available to perform tasks, to specify types of qualifications that task performer users may need to perform supplied tasks, etc. The task requesters 120 and/or entities 105 may take various forms, such as a user who interactively accesses the system 100 (e.g., via a GUI, or graphical user interface, displayed on a computing system of the task requester user, not shown, such as a GUI based on Web pages provided by the system 100 and/or based on execution of a client-side application on the computing system), or a software application that is programmatically interacting with the system 100 (e.g., via an API of the system 100, not shown) on behalf of a related task requester user or other entity.

When a task requester 120 supplies information about one or more tasks, or the task exchange server 100 receives or generates media target identification tasks based on information from an entity 105, the task exchange server 100 stores the task-related data in the task information data repository 130, which may then be made available to task performer users 110 to perform those tasks in a manner specified by the task requester 120 or entity 105, or otherwise determined by the task exchange server 100. The supplied information for a task may include a variety of types of information, including one or more pieces of media data to be reviewed, other details related to the task (e.g., other types of information to be analyzed, a question to be answered, etc.), one or more qualifications of any task performer user who performs the task, one or more geographical locations associated with the task, one or more capabilities and/or other current characteristics of one or more devices to be used as part of performing the task, one or more criteria related to task performance (e.g., deadlines for completion, format of results from task performance, etc.), one or more associated rewards (e.g., monetary payments) to be provided to one or more task performer users who successfully perform the task, etc.

The task exchange server 100 also provides various functionality related to the performance of tasks by task performer users 110. For example, when a task performer user requests information about available tasks (e.g., as part of a search or browse request), the task exchange server 100 provides task-related data obtained from the task information data repository 130. In addition, when a task performer user requests to perform (or is assigned for performance) a particular task, the task exchange server 100 stores a temporary association between the task performer user and the task (e.g., in the task performance results information data repository 140). Then, when the task performer user has completed performance of the task, such as by providing task results for the performed task to the task exchange server 100, the task exchange server 100 stores the task results in the task performance results information data repository 140. The task exchange server 100 may also perform other related functions, such as notifying a task requester of the task results and/or completion of the performed task, facilitating a reward for performing the task (e.g., by crediting an account associated with the task performer or initiating a funds transfer to provide a monetary payment for a fee-based task), etc.

The task exchange server 100 also provides various functionality related to the management of various users, such as task requester users 120, task performer users 110, and other users 105. For example, such users may register with the task exchange server 100 by providing identifying information (e.g., name, address, telephone number(s), email addresses, etc.), possibly accompanied by various user preference information and/or payment information that may be used to facilitate payments between task requesters and task performer users for the performance of tasks. Such user-related information may be stored by the task exchange server 100 in the user information data repository 150, and the task exchange server system 100 may further in some embodiments store various user-related information in the repository 150 (e.g., information about previously interactions between the system and the user, such as to reflect aggregate information about previous task performance for task performer users). In addition, task performer users 110 may also in at least some embodiments obtain qualifications that may be utilized for purposes of matching task performer users with appropriate tasks, with such qualification information also being stored in the user information data repository 150.

Figure 2A:
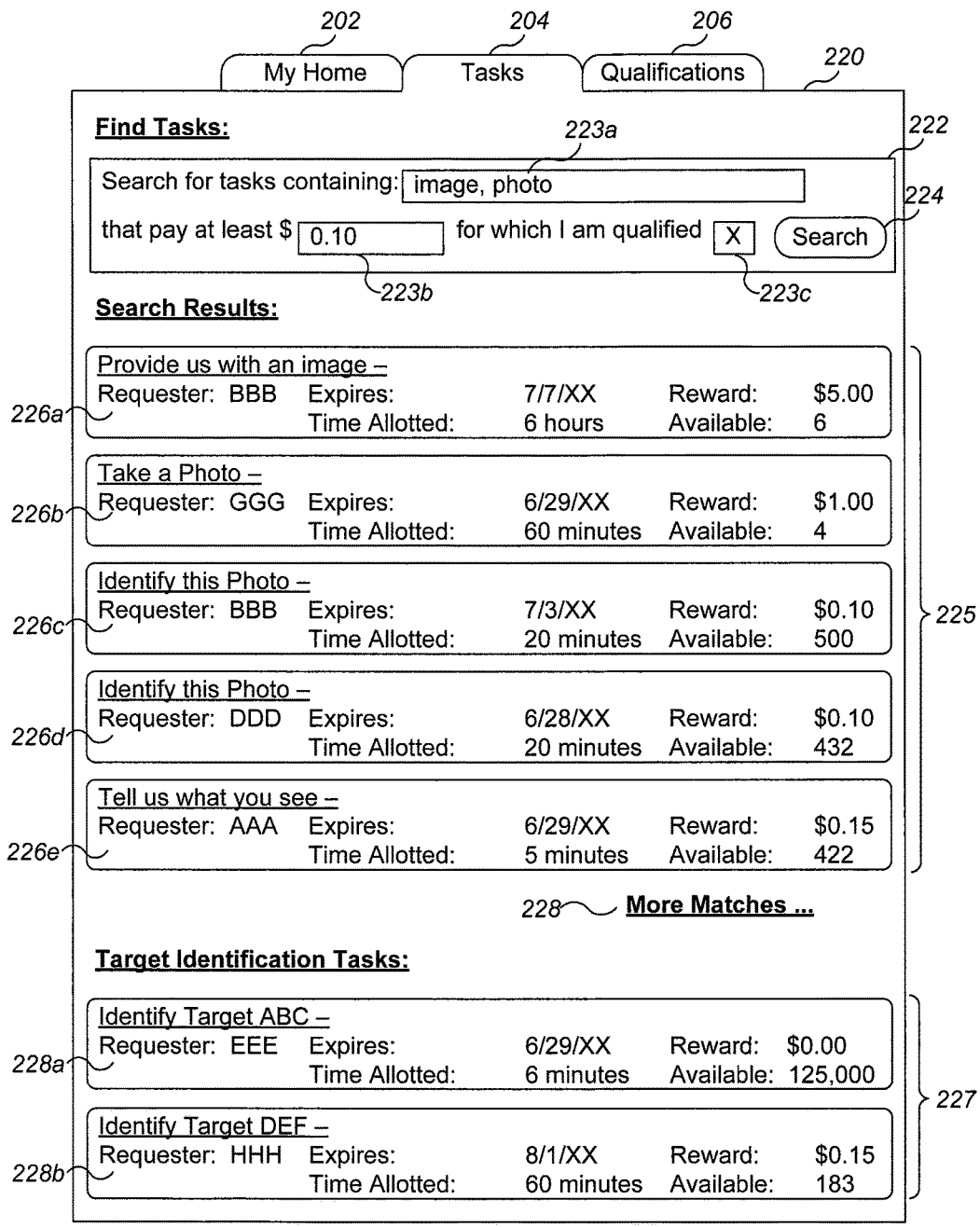
Figure 2C:
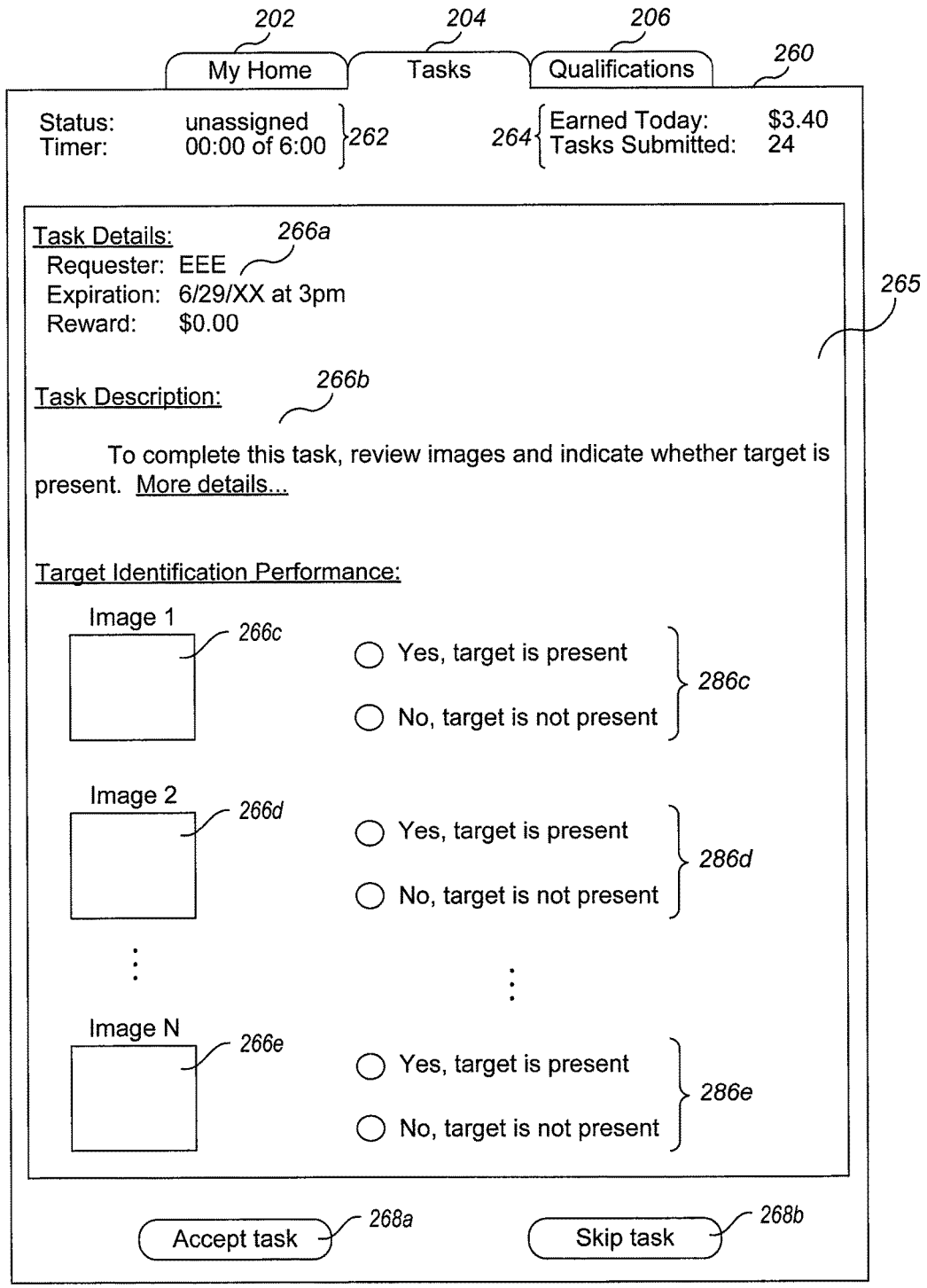

FIGS. 2A-2C illustrate examples of using media target identification tasks for performance by human task performer users. In particular, FIG. 2A illustrates an example user interface 220 that may be used to provide information about various tasks to be performed in an electronic task exchange system, including media target identification tasks. The example user interface includes a search control area 222 that includes various user input controls 223a-223c for specifying search criteria for a search for available tasks. The illustrated user input controls 223a-223c include a user input control 223a to specify one or more keywords (e.g., "image" and "photo"), a user input control 223b to specify a minimum price (e.g., $0.10) for fee-based tasks, and a user input control 223c to specify that matching tasks have qualifications held by the user performing the search. The search control area 222 also includes a user-selectable control 224 to initiate a search for available tasks having attributes that match the specified search criteria.

After a search is performed, available tasks having attributes that match the specified search criteria are displayed via a search results section 225. In this example, the illustrated search results section 225 includes descriptions of available tasks 226a-226e that have attributes that match the specified search criteria, along with a user-selectable control 228 that the user may use to obtain information about additional tasks matching the specified search criteria. The illustrated descriptions of available tasks 226a-226e each include various information about one or more available tasks, including a brief textual description of the tasks, an indication of the identity of the task requester that submitted the tasks, an expiration date of the tasks, an amount of time allotted to perform a task, a reward that the task performer will be paid for the successful completion of one of the tasks, and the number of such tasks available for performance.

The example user interface 220 also displays at least some available media target identification tasks in media target identification tasks section 227. In this example, the illustrated media target identification tasks section 227 includes descriptions of available media target identification task groups 228a and 228b. Similar to available tasks 226a-226e, the illustrated descriptions of available media target identification tasks 228a and 228b each include various information, such as a brief textual description of the tasks, an indication of the identity of the media target identification task information supplier requester that initiated performance of the tasks, an expiration date of the tasks, an amount of time allotted to perform a task, a reward (if any) that the task performer will be paid for the successful completion of one of the tasks, and the number of such tasks available for performance. In this example, media target identification task group 228a to "Identify Target ABC" has a reward of $0.00, indicating that these media target identification tasks are non-fee-based tasks to be performed without payment to human task performer users, such as, for example, by task performer users as part of a charitable target identification effort. Such non-fee-based tasks may have some advantages in some situations, such as by attracting humans who are dedicated to providing high-quality results, allowing anonymous participation, minimizing incentives to attempt to defraud the task exchange server by not truly performing the tasks (e.g., using automated bots to randomly supply results for tasks in an attempt to receive corresponding payment), etc. In contrast, example media target identification task group 228b to "Identify Target DEF" has an associated reward of $0.15, indicating that a task performer user will be paid $0.15 for successfully performing one of those media target identification tasks. In other embodiments, tasks may be displayed in other manners, such as if only non-fee-based tasks are shown in section 227, if non-fee-based tasks are not displayed if a user searches for fee-based tasks, if non-fee-based tasks and fee-based tasks are not displayed together as part of the same screen or page, etc.

Multiple user-selectable navigation tab controls are also shown as part of this example user interface to allow a user to view various types of available information, such as information regarding available tasks via the currently selected Tasks tab 204, information regarding their own or available qualifications (e.g., by searching or browsing) via the Qualifications tab 206, and overview information regarding the user's account (e.g., contact information, payment information, etc.) or other status via the My Home tab 202. It will be appreciated that other types of information may be displayed in other embodiments, and that types of information may be organized and displayed in other manners in other embodiments.

FIG. 2B illustrates an example user interface 240 that may be presented to a user performing a media target identification task. The example user interface 240 includes information that describes a media target identification task available for performance to a potential task performer user or other user. Such a display may be presented to a user, for example, after the user has browsed or searched for available tasks and selected a particular media target identification task, such as from the media target identification task group 228a of FIG. 2A. In this example, the user interface 240 includes a status section 242 that provides information about the status of the task (which in this example is assigned to the current task performer user for performance) and about the time remaining for the user to perform the task. In addition, the example user interface further includes a user information section 244 that provides information regarding the total amount of tasks performed and money earned by the user on the current day. While not illustrated here, in other embodiments the section 244 may further include information specific to non-fee-based tasks that the user has performed, such as to provide recognition and motivation for performing such tasks. This example also includes several user-selectable navigation tab controls 202, 204, and 206, as described with respect to FIG. 2A.

The example user interface 240 also includes a task section 245 that provides various details about the available media target identification task to be performed and user input controls that may be utilized to provide task performance results, including task details 246a (e.g., task requester information, associated reward for performance, task expiration date, etc.) and a task description 246b that includes instructions specific to performing the illustrated media target identification task. In this example, a target identification performance section includes images 246c and 246d and user input controls 246e and 246f. For example, in the illustrated embodiment, a review image 246c piece of media data is provided so that the user may review the image to determine whether it contains one or more targets similar to an example target illustrated in example image 246d. After reviewing the image 246c, the user provides results of the performance in this example by selecting an appropriate radio button from user input controls 246e to indicate whether the review image appears to contain the target or something similar to the target (e.g., "Yes, . . . " if the image contains the target ABC; "No, . . . " otherwise) and by optionally entering additional comments into text box 246f (e.g., to assist others who later receive the results in determining what portion of the image the user believes to be relevant, etc.). After performing the media target identification task, the user may submit the results of the performance or cancel the performance by selecting controls 248a or 248b, respectively.

In various embodiments, the example image 246d may illustrate one or more targets in various ways. For example, the example image may present an example of a target as it may appear in an image similar to one being reviewed by the task performer user, such as review image 246c. In such embodiments, factors related to how a target may appear in an image being reviewed include factors related to perspective, distance, lighting, color, setting, etc. In addition, in some embodiments, the example image may display only information that presents an image of a target (e.g., an image of a target without any distinct background information), while in other embodiments the example image may display information that presents an image of a target as well as other image information (e.g., an image of a target in a distinct setting and/or among other visible features, etc.). In some additional embodiments, the example image may be presented with one or more indications identifying the target in the example image (e.g., indications such as textual descriptions of the target and/or visual highlights such as circles, arrows, etc.). In other embodiments, an example image may not be provided. Furthermore, various other types of information may be provided to the task performer user in some embodiments, such as to provide status information or other information related to the ongoing target identification effort to which the current media target identification task corresponds (e.g., a number or percentage of non-fee-based tasks that have already been performed).

Although FIG. 2B illustrates an example of a media target identification task that requests a task performer to indicate whether an image appears to contain a target (e.g., whether an image contains indicated target ABC), media target identification tasks may be presented and performed in various other ways in various other embodiments. For example, in some embodiments, a task performer may identify the quality and/or quantity of targets contained in an image, and in such embodiments the task performer may provide results in various manners (e.g., selection boxes, text boxes, drop-down lists, radio buttons, etc.). As another example, a task performer may identify and indicate whether an image contains one or more of various types of indicated targets. Furthermore, while not illustrated here, the user may be able to provide other types of results, such as to indicate a degree of certainty of the user or a degree of likelihood that the target is present in the review image (e.g., by selecting from an enumerated scale with multiple options).

FIG. 2C illustrates an alternative example embodiment of a user interface 260 that may be utilized by a user who is considering whether to perform a media target identification task. The example user interface 260 includes information that describes a media target identification task available for performance by a potential task performer or other user, and may be presented to such a user, for example, after the user has browsed or searched for available tasks and selected a particular media target identification task group, such as media target identification task group 228a of FIG. 2A. The example user interface 260 includes a status section 262, user information section 264, and user-selectable navigation tab controls 202, 204, and 206, similar to controls 242, 244, 202, 204 and 206, respectively, described with respect to FIG. 2B. In addition, user-selectable controls 268a and 268b are available to the user for use in accepting or rejecting, respectively, this media target identification task for performance.

In the illustrative example of FIG. 2C, a task section 265 provides various details about the available media target identification task and user input controls that may be utilized to provide task performance results, including task details 266a (e.g., requester, reward, expiration date, etc.) and a task description 266b that includes instructions specific to performing the illustrated media target identification task (e.g., "review images and indicate whether target is present"). In this example embodiment, the target identification performance section includes multiple review images 266c-266e that each has corresponding user input controls 286c-286e. In the illustrated embodiment, images 266c, 266d, and 266e are provided such that a user may review each image to determine whether it contains an indicated target, and input controls 286c, 286d, and 286e are provided so that the user may indicate whether the corresponding image 266c, 266d, and 266e, respectively, contains a target. For example, after reviewing image 1 266c, a user may select an appropriate radio button from input control 286c to indicate whether image 1 contains the indicated target. Although not depicted in this example, other embodiments may include an example image that indicates a target, for example, similar to example image 246d in FIG. 2B.

In various embodiments, the illustrated images 266c-266e may include a number of distinct image media data pieces that vary from each other in various ways. Some examples of such variations may include the following: each image corresponds to different subject matter, such as to different portions of a geographical area (e.g., each portion having differing geographic coordinates); each image corresponding to the same general subject matter at different times (e.g., images of the same geographical area or subject, each taken at a different time, such as one before the target may be present and another after the target may be present to allow differences to be more readily identified); each image corresponding to the same general subject matter taken from different positions (e.g., images taken from different vantage points, stereoscopic imagery, etc.) and/or corresponding to a different type of imagery (e.g., satellite, photo, infrared, ultraviolet, color, black-and-white, grayscale, etc.); each image corresponding to a portion of a larger image, such as images that overlap in part or that form a sequence; each image corresponding to a portion of or a frame from a video; each image of a different format or resolution; etc. In other situations, multiple media data pieces of different media types may be included, such as one or more images and one or more audio clips that are related (e.g., corresponding to the same location and time).

Although FIGS. 2B and 2C illustrate example embodiments of media target identification task user interfaces, such tasks may be presented to and performed by task performers in various ways in various embodiments. For example, although images are presented as being arranged either horizontally or vertically in relation to each other, images may be arranged in other ways in other embodiments. As another example, in various embodiments, task performance results may be provided by a user in a variety of manners, including via radio buttons, checkboxes, buttons, switches, text areas, selection lists, drop-down list, etc. Furthermore, in various embodiments, images may include various types of media, such as two-dimensional, three-dimensional, video, etc. In addition, images may be of various formats, including GIF, BMP, JPEG, RAW, PNG, PDF, SWF, SVG, MPEG, etc., and may be generated in various ways. In addition, in other embodiments one or more review images or other media data pieces may instead be provided to a user in a manner that is not part of a user interface, such as data sent to the user for display or other review in a manner selected by the user (e.g., on a selected device using a selected image viewer or other media player).

In addition, in at least some embodiments, the media task identifier system may perform various types of processing of media data to be reviewed by humans before that review occurs, such as the request of a user or other entity who initiated a target identification effort that involves the media data, and/or as part of the standard functionality provided by the media task identifier system. For example, for image and video media data, various types of image manipulation processing may be performed in at least some situations, such as one or more of the following: color correction or other color modification (e.g., to highlight differences between target objects and other subject matter present in the images); brightening and other contrast changes; sharpening; cropping; noise removal; etc. Similar types of processing may be performed for audio media data and other types of media data.

Furthermore, media data may be manipulated in other manners in order to prepare it for human review in at least some embodiments, such as for use in various media target identification tasks. For example, for a particular target identification effort and type of media data, determinations may be made as to the size or other characteristics of each piece of media data to be individually reviewed as part of a media target identification task in a specified manner, such as to be of a size that will allow human review to be performed within a predetermined amount of time (e.g., based on an expected transmission rate to provide the media data to human users, based on an amount of memory that is likely available on computing devices of the human users, on a likely size of a display or other presentation capabilities that is likely available on computing devices of the human users, etc.), to correspond to a certain amount of subject matter (e.g., a certain geographical area size for images of a geographical area), to correspond to a screen resolution that is expected for computing devices of the human users, etc. After a desired size and/or other characteristics are determined, corresponding pieces of media data may be generated in various ways, such as by splitting a larger amount of media data into smaller pieces (e.g., splitting a very large image file into multiple smaller image files), by combining multiple smaller media data pieces together, by selecting available media data pieces that are an appropriate size, by manipulating available media data pieces to remove some data, etc.

In addition, determinations may be made regarding various other factors that affect media target identification tasks, such as the following: the number of pieces of media data to be reviewed in each media target identification task; the number of distinct human users to independently review each distinct piece of media data (e.g., 1, 5, etc.); the threshold for determining when a piece of media data is sufficiently relevant for further use, such as by being likely to contain one or more targets (e.g., based on a quantity of distinct human users who each identify the media data piece as containing those targets, based on a level of certainty of one or more human users that the media data piece contains those targets, etc.); and/or the types of further use of the media data pieces that are determined to be sufficiently relevant (e.g., to provide the determined media data pieces to other users for further review, such as experts or other higher-qualified users who have specialized capabilities for such further review; whether to provide the determined media data pieces to one or more external government agencies or other organizations for their use, such as if they are involved in search activities or other related activities; whether to rank the determined media data pieces relative to each other based on likely relevance, such as to facilitate further human review and/or actions of external organizations; etc.).

In addition, embodiments of the media target identifier system may perform various other actions in other embodiments. For example, in some embodiments, the media target identifier system may perform an automated analysis of media data pieces to determine whether the media data pieces are likely to contain targets of interest, such as before human review of those media data pieces in order to prioritize the dispatching of the most promising media data pieces for initial human review, and/or after human review of those media data pieces to confirm or supplement the results of the human review. In addition, some embodiments of the media target identifier system may prioritize or otherwise select a subset of the available media data pieces for review in various other ways that are not based on prior human review or automated analysis of those media data pieces, such as based on those media data pieces corresponding to a subset of the total available subject matter that is most likely to be relevant (e.g., images that correspond to a subset of a large geographical area that is most likely to contain missing people or vehicles). In addition, while in some embodiments any human users are allowed to participate in the human review of the media data pieces and are treated in a uniform manner with respect to such review, in other embodiments various information about the human users may be used in various ways (e.g., to restrict performance of some or all media target identification tasks to only certain human users, such as those having specified qualifications; to prioritize the review activities of some human users, such as to allow the human users with the highest qualifications and/or most relevant experience to review the tasks with the highest priority media data pieces and/or to perform further review of media data pieces that have been identified by other human users as being likely to be relevant; to use information about particular human users when assessing results received from those human users, such as to give greater weight to identifications of media data pieces that are likely relevant if those human users are highly rated with respect to relevant experience, qualifications and/or diligence; etc.). Various types of human user qualifications and other information may be relevant to various types of media target identification tasks, such as whether a particular user has impaired sight or hearing, is color blind, has successfully passed a sample test related to review of similar types of media data pieces, has a security clearance to allow review of classified media data pieces, etc.

In addition, various embodiments of the media target identifier system may perform additional activities to facilitate a target identification effort, such as to provide a bonus, reward or other compensation to one or more human users who successfully identify targets of interest, to assist in visualization of partial results received from performance of some media target identification tasks (e.g., by displaying the relevance of reviewed media data pieces on a map or in another manner), to analyze partial results received from performance of some media target identification tasks to facilitate further review of other of the media target identification tasks (e.g., to prioritize the further review of the other media target identification tasks based on an analysis of the partial received results, such as to prioritize media data pieces that are similar to reviewed media data pieces determined to be likely to be relevant), etc. Various other types of functions may similarly be performed by embodiments of the media target identifier system.

As previously noted, the functionality of the media target identifier system may be used in various ways in various embodiments. A non-exhaustive list of examples of such uses include the following: locating one or more missing people and/or vehicles, such as to supplement and/or direct a physical search of a large geographical search area or one or more other physical locations (e.g., to find lost hikers, skiers or climbers based on review of aerial or satellite imagery, to find shipwrecks based on the review of sonar imagery, etc.); locating one or more missing people based on review of surveillance images or other media data, such as to assist an Amber Alert search for an abducted child based on review of traffic camera video and/or other information; performing a review of medical imagery to identify particular conditions or other anomalous data, such as to correspond to a particular physical location within a patient's body; performing a census for animals or other objects of interest in a geographical area; searching for survivors or other objects of interest after a disaster or accident; assisting law enforcement personnel or enhancing private security by reviewing media data to identify dangerous and/or illegal activity (e.g., vehicles that run red lights, people who are driving dangerously, people are illegally entering a building or restricted area or crossing a geopolitical border, people who may be shoplifting or otherwise stealing items, people who may be creating graffiti, etc.); and identifying or locating targets for entertainment purposes, such as a single-user or multi-user game. Furthermore, while in some embodiments a target to be identified may be a particular indicated object (e.g., a particular person or vehicle), in other embodiments a target may have other forms, such as something anomalous with respect to expected subject matter (e.g., something unexpected that is present, such as relative to an example provided of expected subject matter that does not include that unexpected subject matter; something expected that is not present, such as relative to an example provided that includes the expected subject matter; etc.), something that corresponds to a discernible pattern that is present or that is interrupted (e.g., in multiple pieces of media data, or with respect to one or more example media data pieces), etc.

In some situations, visual media may be difficult or nearly impossible to obtain, or may not be as beneficial as, for example, audio media. For example, in low-light environments such as caves or deep water environments, it may be advantageous to record sound at various physical locations for review by task performer users. In such situations, for example, microphones may be placed throughout a low-light environment, or high-sensitivity sound instrumentation may be used to record sounds from afar. Resulting audio media data can then be split into small audio clip portions and provided to task performer users for review, such as to determine whether sounds indicative of a target of interest are found in the sample. In some situations a combination of audio and video media data may be used.

As previously noted, in at least some embodiments and situations, the identification of targets of interest based on human review of media data may be part of or otherwise facilitate a related effort by others, such as physical search activities in a geographical area or other group of multiple physical locations. In such situations, each image or other media data piece may correspond to a subset of that geographical area or other specific physical location, such that, after human review identifies a particular image or other media data piece as being likely to contain or include the target, the particular geographical area subset or other physical location corresponding to that media data piece may be identified and used (e.g., for further human review of media data pieces corresponding to that physical location, to direct future physical search of that physical location, etc.). A non-exhaustive list of external people and/or organizations with which an embodiment of a media target identifier system may coordinate target identification efforts includes the following: the border patrol (e.g., to detect target illegal crossing of a border); one or more police departments or other organizations involved in locating a target abducted person, such as the FBI (e.g., as part of an Amber Alert search); one or more organizations involved in a search for a target missing person (e.g., search and rescue teams, the forest service, sheriffs' departments and other police organizations, etc.); one or more organizations involved in a search for a target lost plane, boat or other vehicle (e.g., the police, Navy, Coast Guard, a weather-related agency such as the Center for Analysis and Prediction of Storms; etc.); rescue teams attempting to locate particular targets that are trapped or otherwise in need of rescue (e.g., miners or others trapped in a mine or cave or collapsed building or otherwise underground, people buried in an avalanche, etc.), such as search and rescue teams, drilling and other excavation teams, etc.; firefighters and other emergency response personnel, such as to respond to an identified target emergency event or occurrence; people with specialized capabilities with respect to review and/or analysis of particular types of media data to identify targets of interest, such as surgeons and other doctors with respect to review of medical imagery data; providers of media data of use, such as to obtain media data for initial human review and/or to direct further acquisition of particular media data based on partial results of human review of other media data; etc. Thus, in at least some situations, the media target identifier system may coordinate with one or more physical search people or teams or other external organizations in one or more of various ways, including the following: to identify one or more particular physical location to review, such as from identification of those physical locations as likely containing a target of interest based on human review of corresponding media data; to identify one or more particular physical locations to not further review (or for which to de-emphasize further review), such as from identification of those physical locations as not likely containing a target of interest based on human review of corresponding media data; to rank the relevance of multiple physical locations for further review, such as based on results of human review of corresponding media data and/or other automated processing; to obtain relevant media data from them for human review; to direct acquisition of additional media data based on initial results of human review of other media data; etc. Various other types of external people and/or organizations, as well as other types of coordination with such external people and/or organizations, may similarly be interacted with by embodiments of the media target identifier system.

Figure 3:
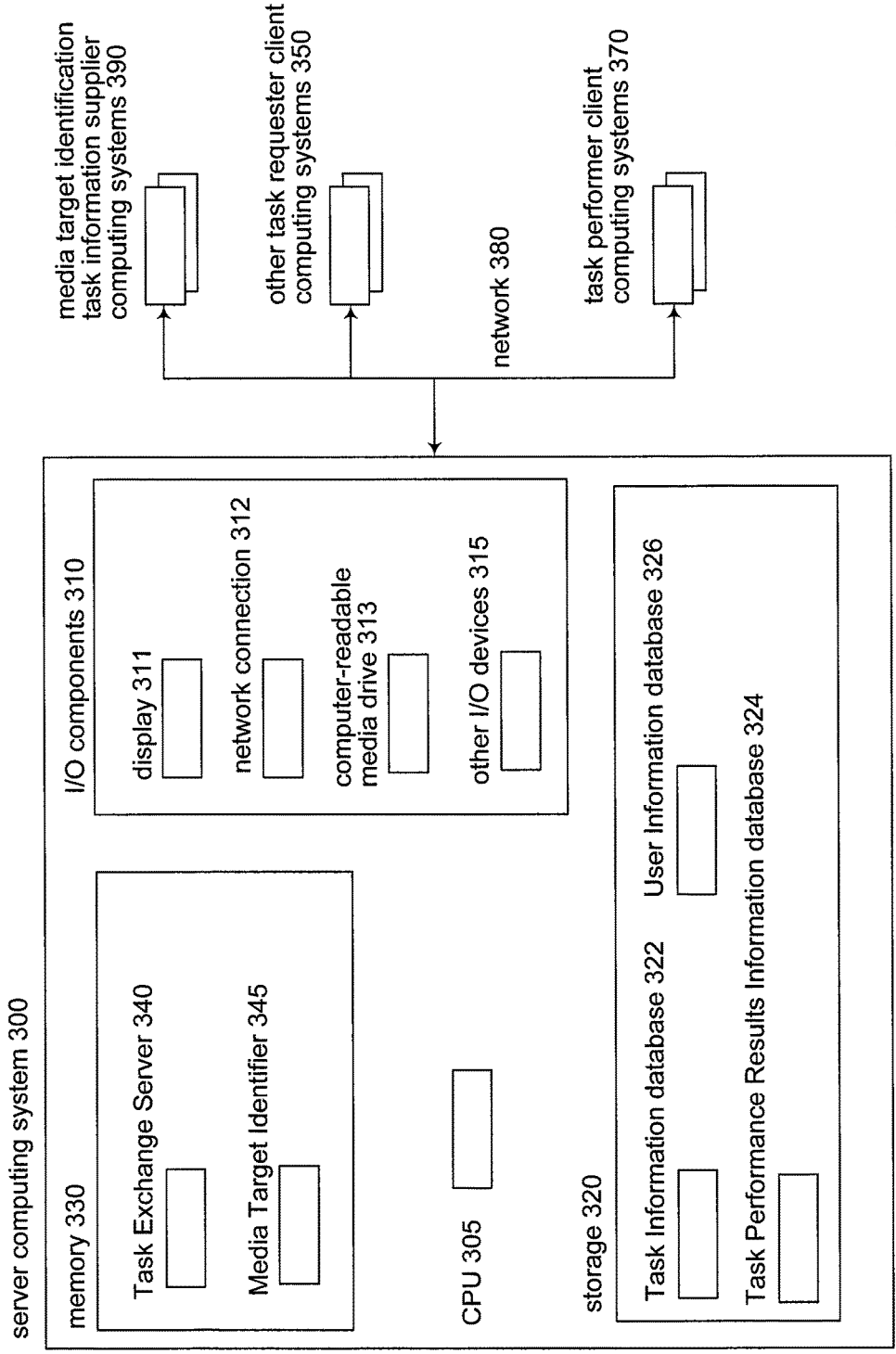
FIG. 3 is a block diagram illustrating an example computing system suitable for executing an embodiment of a system that facilitates identification of targets in media data by humans.

FIG. 3 is a block diagram illustrating a computing system suitable for executing an embodiment of a system that coordinates or otherwise facilitates performance of tasks involving human review of media data to identify targets of interest. In particular, FIG. 3 illustrates a server computing system 300 suitable for executing an embodiment of a task exchange server system 340 and an embodiment of a media target identifier system 345, as well as various task requester client computing systems 350, task performer client computing systems 370, and computing systems 390 used by external entities to supply information related to media target identification tasks. In the illustrated embodiment, the server computing system 300 includes a CPU 305, various I/O components 310, storage 320, and memory 330. The I/O components include a display 311, a network connection 312, a computer-readable media drive 313, and other I/O devices 315 (e.g., a keyboard, mouse, speakers, etc.).

In this illustrated embodiment, the server computing system 300 executes both a media target identifier system 345 and a task exchange server system 340, such as if the systems 340 and 345 are operated by a single entity and the media target identifier system 345 interacts with the task exchange server system 340 to obtain performance of media target identification tasks. In other embodiments, other arrangements may be used, such as if the server computing system executes a media target identifier system 345 that interacts with one or more remote task exchange server systems (not shown) or similar systems, if one or more remote media target identifier systems (not shown) interact with the task exchange server system 340 executing on the server computing system, or if the server computing system executes a single system (not shown) that provides functionality corresponding to both a media target identifier system and a task exchange server system (whether the single system is referred to as a media target identifier system, as a task exchange server system, or as some other form of system).

In this illustrated embodiment, the task exchange server 340 is executing in the memory 330, and it interacts with the other computing systems 350 and 370 over a network 380 using the network connection 312 (e.g., via the Internet and/or the World Wide Web). In the illustrated example, the task exchange server 340 is a software implementation of the task exchange server 100 described with reference to FIG. 1. While not illustrated here, the task exchange server system 340 may include multiple components that each performs a subset of the functionality of the system 340. As described in greater detail elsewhere, the task exchange server may provide various functionality to act as an intermediary to facilitate performance by task performer users of tasks supplied by task requesters. The task exchange server 340 may access and use various task-related and user-related information on storage 320, such as in task information database 322, task performance results information database 324, and user information database 326. The task information database 322, task performance results information database 324, and user information database 326 are respective database data structures that may, for example, be used to implement the task information data repository 130, task performance results information data repository 140, and user information data repository 150 described with reference to FIG. 1.

Human task requester users may use, for example, application programs (not shown) executing on the task requester client computing systems 350 to communicate via the network 380 with the task exchange server 340, such as to submit tasks to be performed and obtain results of performance of such task by task performer users. In addition, human task performer users may utilize Web browsers or other programs (not shown) executing on the task performer client computing systems 370 to communicate via the network 380 with the task exchange server 340, such as to perform tasks and provide task performance results. The programs used by the task requester users and/or task performer users may, for example, include custom client applications that communicate via standard and/or proprietary protocols with the task exchange server 340 and/or some intermediary application (e.g., a Web server). In some embodiments, the task exchange server 340 may further provide an API that provides programmatic access to at least some of the functionality provided by the task exchange server 340.

In addition, in this illustrated embodiment, the media target identifier system 345 is executing in the memory 330, and it interacts with the computing systems 390 over the network 380 to receive information about target identification efforts and to provide results from such efforts. The media target identifier system 345 may further in some situations interact with other remote computing systems (not shown), such as to obtain media data from third-party suppliers of such data, to provide results of target identification efforts to appropriate third-parties entities (e.g., governmental authorities if the media target identification effort is a search effort), etc. The media target identifier system 345 further interacts with the task exchange server system 340, such as to supply groups of related media target identification tasks to the task exchange server system, and to obtain results of performance of such supplied media target identification tasks. While not illustrated here, the media target identifier system 345 may include multiple components that each performs a subset of the functionality of the system 345. The media target identifier system 345 may access and use various task-related and user-related information on storage 320, such as in task information database 322, task performance results information database 324, and user information database 326, or in other embodiments may create and maintain one or more one database data structures. In a manner similar to that described with respect to the task exchange server 340, users and other entities may interact with the media target identifier system 345 in various ways, such as by using Web browsers or other programs (not shown) executing on the computing systems 390 to communicate via the network 380 with the media target identifier system 345. In some embodiments, the media target identifier system 345 may further provide an API that provides programmatic access to at least some of the functionality provided by the media target identifier system 345.

It will be appreciated that computing systems 300, 350, 370, and 390 are merely illustrative and are not intended to limit the scope of embodiments of the present disclosure. The task exchange server 340 and/or media target identifier system 345 may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device or a computing node may comprise any combination of hardware, firmware, or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the task exchange server 340 and/or media target identifier system 345 may in some embodiments be provided via various components, and may be combined in fewer components or distributed in additional components than those described herein. Similarly, in some embodiments, the functionality of some of the components may not be provided as part of the task exchange server 340 and/or media target identifier system 345, and/or other additional functionality may be available.

It will also be appreciated that, while various items are discussed or illustrated as being stored in memory or on storage while being used, these items or portions of them can be transferred between memory and other storage devices for purposes of memory management and data integrity. Alternatively, in other embodiments some or all of the software systems and/or components may execute in memory on another device and communicate with the illustrated computing systems via inter-computer communication. Furthermore, in some embodiments, some or all of the systems and/or components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components and/or data structures may also be stored (e.g., as software instructions or structured data) on a computer-readable medium, such as a hard disk, a memory, a network, or a portable media article to be read by an appropriate drive or via an appropriate connection. The systems, components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
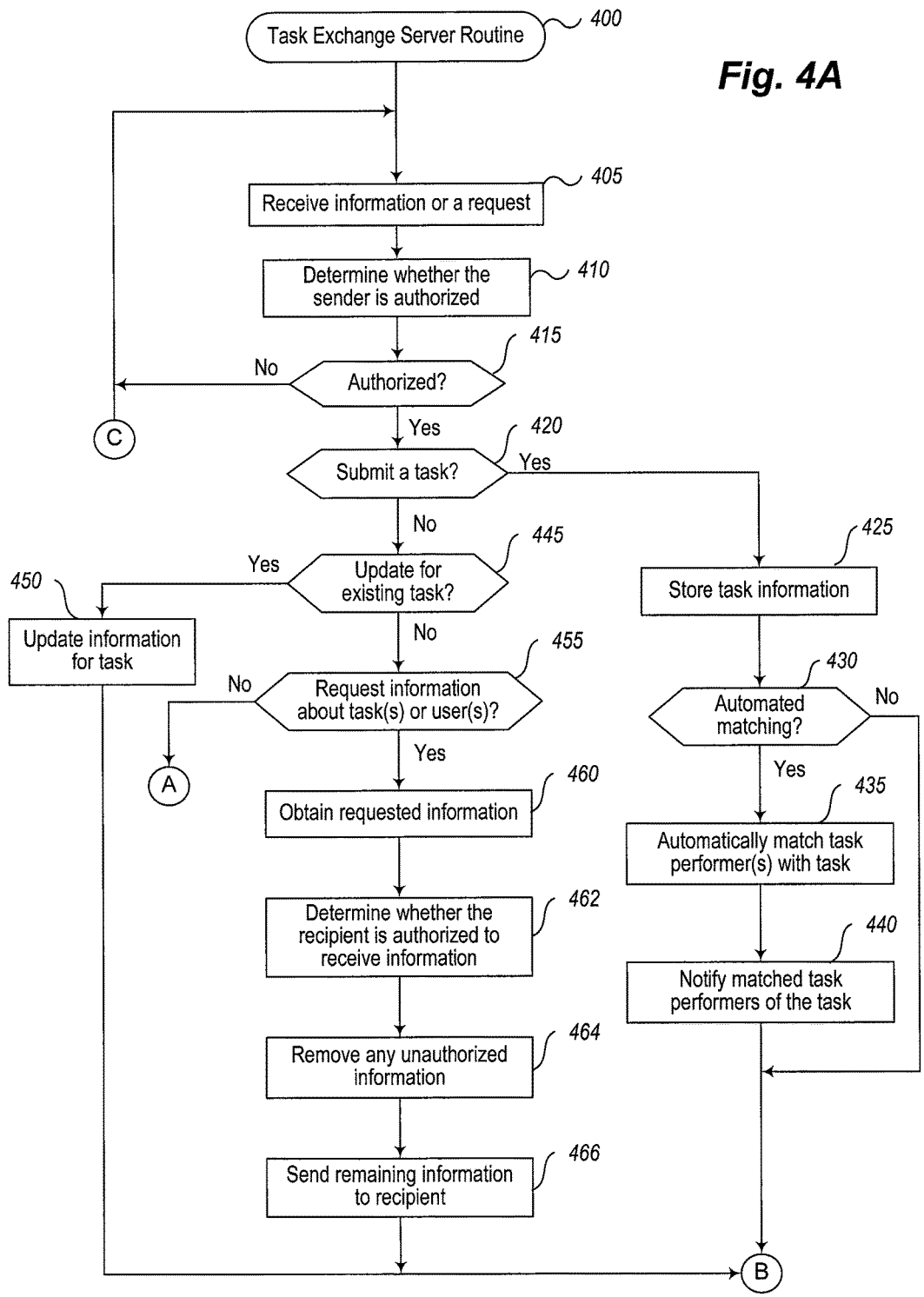
FIGS. 4A and 4B are a flow diagram of an example embodiment of a Task Exchange Server routine.
Figure 4B:
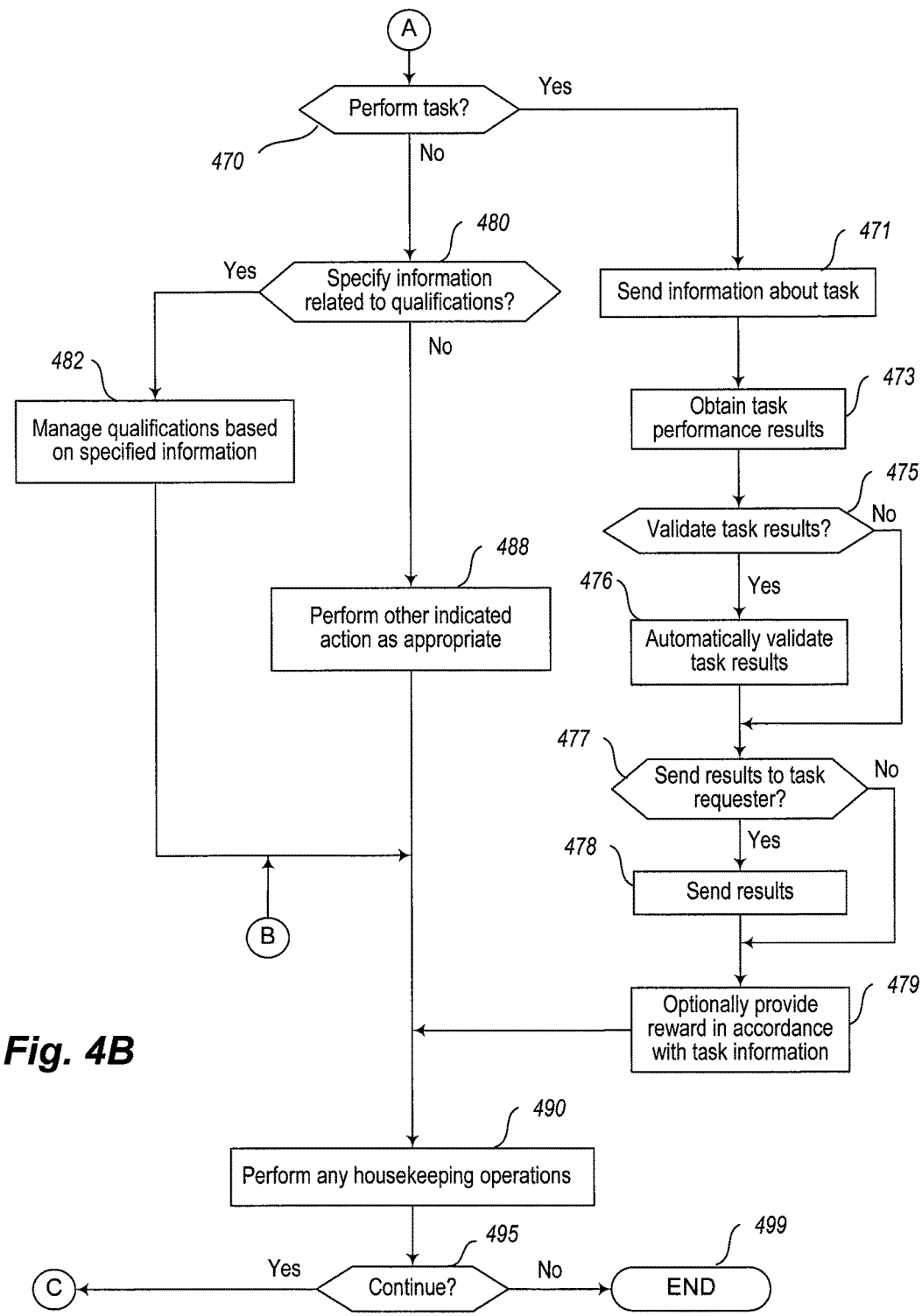

FIGS. 4A and 4B are a flow diagram of an example embodiment of a Task Exchange Server routine 400. The routine may be provided by, for example, execution of an embodiment of the task exchange server 100 of FIG. 1 and/or the task exchange server 340 of FIG. 3, such as to in this illustrated embodiment facilitate performance of tasks by interacting with task requesters and task performer users as appropriate.

In this illustrated embodiment, the routine begins at block 405, where an indication is received of information or a request, and in block 410 determines whether the sender of the information or request is authorized to perform requests of that type or provide information of that type (e.g., based on prior registration of the users with the task exchange system, and/or on other previously defined access controls for specific users or types of users). If the routine identifies the sender as authorized in block 415, the routine continues to block 420 to determine whether the received indication is a request to submit one or more tasks. If so, the routine continues to block 425 to store task information received in block 405, including any specified task performance criteria related to task performance, information about any associated rewards for performance of the task, any associated information to be analyzed or manipulated as part of the task, etc. The routine then continues to block 430 to determine whether to perform automated matching to identify task performer users who are appropriate to perform the task, such as based on the type of task submitted (e.g., a non-fee-based task, a type of media target identification task, etc.) and/or an explicit request by the submitter of the task, although in other embodiments such automated matching functionality may not be provided. In the illustrated embodiment, if automated matching is to be performed, the routine continues to block 435 to automatically match one or more task performer users with the task by, for example, identifying one or more task performer users whose qualifications satisfy any qualification criteria for the new task. The routine then notifies those identified task performer users of the task in an appropriate manner in block 440 (e.g., based on previously specified user preferences for those task performer users). After block 440, or if it is instead determined in block 430 that automated matching is not to be performed, the routine continues to block 490.

If it is instead determined in block 420 that the received indication is not to submit a task, the routine continues instead to block 445 to determine whether a request is received to perform an update for an existing task, and if so continues to block 450 to perform the update as appropriate. Such updates may take a variety of forms, such as to modify information about or delete a pending task that has not been performed; to perform an indicated activity related to a task (e.g., to cause a reward to be provided to a task performer user after the task requester has reviewed and accepted task performance results from that task performer user); to add, modify, or remove performance criteria associated with an existing task; to add or modify task release criteria associated with a task that has not yet been released (e.g., a task that is part of a group having at least some tasks of the group that have not yet been released); to update a group of media target identification tasks with status information regarding the overall target identification effort to which that group of tasks belongs; etc.

If it is instead determined in block 445 that the received indication is not to update an existing task, the routine continues to block 455 to determine whether the received indication is a request for information about one or more tasks and/or one or more users, such as for a search or browse request. If so, the routine continues to block 460 to identify and obtain the requested information, and then continues to block 462 to determine whether the indicated recipient of the information is authorized to receive all of the obtained information, such as based on access controls associated with any aspects or elements of the obtained information (although in other embodiments the access determination may be made before or as part of the obtaining of the information). In block 464, the routine then removes information for which the recipient is not authorized, if any, and in block 466 sends any remaining information to the recipient. In some embodiments, indications may be provided to the recipient of any removed information for which they were not authorized, while in other embodiments such indications may not be provided. After blocks 450 or 466, the routine continues to block 490.

If it is instead determined in block 455 that the received indication is not a request for information about tasks or users, the routine continues instead to block 470 to determine whether the received indication is a request from a task performer user to perform an indicated task. If so, the routine continues to block 471 to retrieve and provide information about the task to the task performer user in an appropriate manner (e.g., in a manner specified for the task), and in block 473 obtains results of performance of the task by the task performer user. In block 475, the routine then determines whether to automatically validate the task results, such as based on whether a task requester has specified that the results for the task are to be validated. If so, the routine continues to block 476 to automatically validate task results. Validating task results may be performed in various ways, such as type checking the task results (e.g., by determining whether the task result comprises an integer or other type of data), range checking the task results (e.g., by determining whether a task result is within a particular value range), etc.

After block 476, or if it is instead determined in block 475 not to validate the task results, the routine continues to block 477. In block 477, the routine then determines whether to immediately send the task results to the task requester, such as based on information associated with the task, the outcome of the automated validation of block 476, and/or user preferences for the task requester. If so, the routine continues to block 478 to send the results. After block 478, or if it is instead determined in block 477 not to send the results to the task requester at this time, the routine continues to block 479 to optionally provide any reward associated with the task to the task performer user, such as in accordance with the task information and/or the outcome of the automated validation of block 476. After block 479, the routine continues to block 490.

While the illustrated embodiment indicates a synchronous flow in which the routine waits for and obtains task performance results in block 473 after sending the task information in block 471, in other embodiments the routine may be structured in other manners, such as to continue with other processing while waiting for such task results (if any) to be received. In addition, in some situations, task performer users may not provide task results for a task after they accept an assignment to perform the task, which may be indicated to the routine in an explicit message from the task performer user that the task performer user is abandoning or withdrawing from task performance, or instead by not receiving task results within a specified period of time—if so, the routine may continue to handle other task-related requests and information. In addition, while not illustrated here, in other embodiments various types of notifications may be sent to task requesters related to their submitted tasks, such as when a task is assigned to a task performer user for performance and/or when an assigned task is withdrawn from a task performer user who has not completed the performance.

If it is instead determined in block 470 that the received indication is not to perform a task, the routine continues instead to block 480 to determine whether the received indication is to specify information related to user qualifications, and if so continues to block 482 to manage qualifications based on the specified information. Managing qualifications may include, for example, defining a new type of qualification for use with the system, specifying a particular qualification for a particular user, removing a particular qualification from a user, removing a particular qualification from the system, etc.

If it is instead determined in 480 that the received indication is not to specify qualification-related information, the routine continues instead to block 488 to perform another indicated operation as appropriate, such as to receive and store various types of user information (e.g., information related to a user's identity or attributes, information related to an account of a user with the system, etc.), information related to specifying access controls for information and/or functionality, administrative requests related to system operations, requests for information related to monitoring performance of tasks or other operations of the system, an indication of a task performer user withdrawing from or abandoning an assignment to perform a task, etc.

After blocks 440, 450, 466, 479, 482, or 488, the routine continues to block 490 to optionally perform any additional housekeeping operations, such as to store information that is generated or received during execution of the routine, to generate summary aggregate information for the system related to tasks and users, to take appropriate actions when events do not occur within specified periods of time (e.g., to withdraw assigned tasks from task performer users who do not timely perform the tasks, or to provide rewards to task performer users for tasks that they have performed when task requesters do not timely reject the task results provided by the task performer users), etc. After block 490, the routine continues to block 495 to determine whether to continue. If so, or if it is determined in block 415 that the sender is not authorized, the routine returns to block 405, and if not continues to block 499 and ends.

FIG. 5 is a flow diagram of an example embodiment of a Media Target Identifier routine 500. The routine may be provided by, for example, execution of an embodiment of the Media Target Identifier system 345 of FIG. 3, such as to coordinate efforts to identify one or more target objects based at least in part on a review of media data by various human users. As part of the execution of the illustrated embodiment of the routine 500, the routine interacts with an embodiment of a task exchange server system to obtain performance of media target identification tasks. Alternatively, in other embodiments, a task exchange server system may provide functionality of a media target identifier system, and if so the routine 500 may be provided by execution of a portion of the task exchange server system 100 of FIG. 1 and/or of the task exchange server system 340 of FIG. 3

The illustrated embodiment of the routine 500 begins at block 505, where information is received related to a target identification effort that is based at least in part on review of media data by human users, such as from a user or other entity at whose request the target identification effort is being performed, or from supplier of media data for a previously initiated target identification effort. The information received may have various forms in various embodiments, such as to initiate a new target identification effort and/or to update an ongoing target identification effort. The received information may in various situations include overview instructions or other information related to the effort, an identification of media data to be reviewed as part of the target identification effort, and/or media target identification tasks to be performed as part of the target identification effort. The overview information may indicate, for example, whether the effort is a charitable effort for which human review of media is requested as part of multiple non-fee-based tasks (or if not, information about how to perform fee-based tasks as part of the effort), a type of the identification effort (e.g., to locate one or more missing target people or vehicles in one or more geographical areas based on review of one or more types of imagery of at least some of those geographical areas), any qualifications that are preferred or required for human users who review media data as part of the effort, one or more minimum thresholds to determine when a particular piece of media data is determined to be sufficiently relevant (e.g., based on a quantity of multiple distinct humans who each identify that media data as being sufficiently likely to contain or include one or more of target objects of interest), whether multiple levels of review of media data are to be performed and if so in what manner, etc. In other embodiments, some or all of those types of overview information may instead be automatically determined by the routine based in part on other information about the effort, such as based on a type of the effort and/or one or more types of media data that is available to be reviewed.

In the example embodiment, the routine then continues to block 510 to determine whether the information received in block 505 includes media data to be reviewed as part of a target identification effort. If so, the routine continues to block 515 and optionally processes the media data in one or more ways to prepare it for use in media target identification tasks. As discussed in greater detail elsewhere, such media data processing may include various manipulation of the data, separation of large amounts of media data into smaller clips or other pieces that are appropriate for use in media target identification tasks, etc. The routine then continues to block 520 to generate media target identification tasks for the target identification effort that each includes review of one or more pieces of media data.

If it is instead determined in block 510 that media data to be reviewed is not received, the routine continues instead to block 530 to determine whether media target identification tasks were received in block 505 that each include review of one or more pieces of media data. If so, or after block 520, the routine continues to block 535 to submit the media target identification tasks to a task exchange server service for performance by multiple human users, such as described with respect to FIG. 4, although in other embodiments the routine 500 may instead directly manage performance of the media target identification tasks by human users. In the illustrated embodiment, in block 540 the routine then obtains results of the media target identification tasks from the task exchange server service, such as after waiting for a period of time for those tasks to be performed. While illustrated here as receiving all of the results of the media target identification task before proceeding, in other embodiments the routine may instead be performed so as to incrementally process results of various media target identification tasks as they are received. Similarly, while the routine is illustrated with respect to performing a single target identification effort at a time, in other embodiments the routine may coordinate multiple target identification efforts in parallel such that results from media target identification tasks from multiple efforts may be received together or otherwise in a manner interspersed with media target identification task results from other efforts.

After block 540, the routine continues to block 545 to determine any of the reviewed media data pieces that are sufficiently relevant for further consideration based at least in part on the results of the media target identification tasks, such as to reflect a default relevance threshold or a threshold specified for the current target identification effort (e.g., based on information received in block 505). Such relevance thresholds may have various forms in various embodiments, such as to select only media data pieces that have been identified by a minimum quantity of humans as being relevant for the target identification effort (e.g., as including at least one or instead all of multiple target objects of interest), to select a certain specified top percentage or top number of all of the media data pieces based on a ranking of their relevance relative to other of the media data pieces using the media target identification task results, based on using various information about the human users who perform the task to further weight or otherwise rank the obtained results, based on using results of automated analysis of the media data pieces, etc.

The routine then continues to block 550 to determine whether further review of the determined media data is to be performed in the current embodiment and situation (e.g., such as if further review is always performed, is performed by default unless otherwise specified for the current target identification effort, was previously specified to be performed for the current target identification effort, etc.), although in some embodiments such further review may not be performed. In the illustrated embodiment, if further review is determined to be performed, the routine continues to block 555 to perform further review of the determined media data and to remove any of that data that is subsequently determined to not be sufficiently relevant. The further review may be performed in various manners in various embodiments, including by supplying the determined media data pieces and/or the corresponding media target identification tasks for that media to other human users for review (e.g., higher-qualified human users, such as experts with respect to review of those types of media data pieces), performing one or more types of automated processing of the determined media data, etc. If further human review is performed, such activities may be coordinated directly by the routine 500 in some embodiments, or may instead be performed by supplying corresponding additional tasks to the task exchange server and receiving corresponding results.

After block 555, or if it is instead determined in block 550 to not perform a further review of the determined media data pieces, the routine continues to block 560 to provide information about the determined media data pieces for use as part of the target identification effort. For example, the information may be provided to a user or other entity that provided the information in block 505. Furthermore, based on the type of target identification effort, information may be provided to governmental authorities and/or other organizations involved in the effort to allow them to better focus their activities with respect to the effort. For example, in a search for a target, those performing physical inspection of areas may be directed first to areas that have not been reviewed by human task performer users, may be directed to areas that human task performer users have indicated as being a possible or likely location for the target, and/or may be directed away from areas that human task performer users have indicated as not being a possible or likely location for the target. In addition, various information may be provided, such as a ranking or other determination of a relevance of a particular piece of media data, information about that media data piece (e.g., for imagery data of a particular portion of a geographical area, the GPS coordinates or other location information corresponding to that geographical area portion), etc. Furthermore, in some embodiments, this information is provided by the task exchange server system to authorities or other external organizations without providing the physical location corresponding to a media data piece to the human task performer users. For example, such embodiments prevent human task performer users from circumventing quality control measures implemented by the task exchange system to prevent excessive amounts of false positive target location reports, duplicative reports, and so forth, to those performing physical searches.

If it is instead determined in block 530 that the received information did not include media data to be reviewed or media target identification tasks, the routine continues to block 580 to perform one or more other indicated actions as appropriate. For example, such indicated actions may include supplying additional information about an ongoing target identification effort (e.g., information about contact information for results, new information about particular media data pieces that should be reviewed first or in greater detail, status information regarding the target identification effort, etc.), receiving and responding to requests for status information or other monitoring of an ongoing target identification effort, etc. After blocks 560 or 580, the routine continues to block 595 to determine whether to continue. If so, the routine returns to block 505, and if not, continues to block 599 and ends.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. In addition, while certain aspects are presented below in certain claim forms, the inventors contemplate the various aspects in any available claim form. For example, while only some aspects of the disclosure may currently be recited as being embodied in a computer-readable medium, other aspects may likewise be so embodied.

What is claimed is:

1. A computer-implemented method comprising:
   obtaining, by one or more computing systems of a media target identifier system, information about a target identification effort to identify one or more indicated target objects in a plurality of images;

determining, by the one or more computing systems, an amount of memory to use on one or more client computing devices that will display at least one of the plurality of images;

generating, by the one or more computing systems, the plurality of images, including obtaining media data from one or more sources external to the media target identifier system about one or more areas of interest, and manipulating the media data to produce one or more indicated characteristics for each image of the plurality, wherein the one or more indicated characteristics includes a size of each image that is based at least in part on the determined amount of memory;

analyzing, by the one or more computing systems, at least some images of the plurality to prioritize one or more images of the plurality for the target identification effort; and transmitting, by the one or more computing systems, the one or more images to the one or more client computing devices for display as part of identifying the one or more indicated target objects for the target identification effort.

2. The computer-implemented method of claim 1 wherein the analyzing of the at least some images includes determining a likelihood for each of the at least some images that the image includes at least one of the one or more indicated target objects.

3. The computer-implemented method of claim 1 wherein the one or more areas of interest are a geographical area, wherein the plurality of images in aggregate represent the geographical area such that each image of the plurality represents a subset of the geographical area, and wherein the analyzing of the at least some images includes determining that the at least some images represent a selected one of multiple portions of the geographical area.

4. The computer-implemented method of claim 1 wherein the manipulating of the media data to produce the one or more indicated characteristics for each image of the plurality includes modifying one or more of color, brightness, contrast, sharpness or noise in each image of the plurality.

5. The computer-implemented method of claim 1 wherein the manipulating of the media data to produce the one or more indicated characteristics for each image of the plurality further includes determining an image resolution, and producing each image of the plurality to have the determined image resolution.

6. The computer-implemented method of claim 1 further comprising determining, by the one or more computing systems and based at least in part on the analyzing, one or more additional images to acquire for further use in the target identification effort, and providing the one or more additional images to the one or more client computing devices.

7. The computer-implemented method of claim 1 further comprising coordinating performance, by the one or more computing systems, of further review of the prioritized one or more images for the target identification effort to determine whether the prioritized one or more images include the one or more indicated target objects, including obtaining results from the further review, and providing the received results.

8. The computer-implemented method of claim 1 wherein the media data include visual data of a geographical area, wherein the target identification effort is to identify one or more subsets of the geographical area in which the one or more indicated target objects are likely to be located, and wherein the one or more indicated target objects include at least one of a missing person or a missing vehicle.

9. A non-transitory computer-readable medium having stored contents that cause one or more computing systems to perform automated operations including at least:

obtaining, by the one or more computing systems, information about a target identification effort to identify one or more indicated target objects in a plurality of pieces of media;

generating, by the one or more computing systems, the plurality of pieces of media, including obtaining media data from one or more external sources about one or more areas of interest, and manipulating the media data to produce one or more indicated characteristics for each piece of media data of the plurality, wherein the one or more indicated characteristics includes a size of each piece of media data that is based on at least one of a determined amount of memory or a determined transmission rate;

analyzing, by the one or more computing systems, at least some pieces of media of the plurality to prioritize one or more pieces of media of the plurality for the target identification effort; and providing, by the one or more computing systems, the one or more pieces of media for display on one or more client computing devices as part of identifying the one or more indicated target objects for the target identification effort.

10. The non-transitory computer-readable medium of claim 9 wherein the analyzing of the at least some pieces of media includes determining a likelihood for each of the at least some pieces of media that the piece of media data includes at least one of the one or more indicated target objects.

11. The non-transitory computer-readable medium of claim 9 wherein the one or more areas of interest are a geographical area, wherein the plurality of pieces of media in aggregate represent the geographical area such that each piece of media data of the plurality represents a subset of the geographical area, and wherein the analyzing of the at least some pieces of media includes determining that the at least some pieces of media represent a selected one of multiple portions of the geographical area.

12. The non-transitory computer-readable medium of claim 9 wherein the manipulating of the media data to produce the one or more indicated characteristics for each piece of media data of the plurality includes modifying one or more of color, brightness, contrast, sharpness or noise in each piece of media data of the plurality.

13. The non-transitory computer-readable medium of claim 9 wherein the plurality of pieces of media data include multiple images, and wherein the stored contents include instructions that, when executed, further cause the one or more computing systems to determine, based at least in part on the analyzing, one or more additional pieces of media to acquire for further use in the target identification effort, and to transmit the one or more additional pieces of media over one or more computer networks to the one or more client computing devices.

14. The non-transitory computer-readable medium of claim 9 wherein the stored contents include instructions that, when executed, further cause the one or more computing systems to coordinate performance of further review of the prioritized one or more pieces of media for the target identification effort to determine whether the prioritized one or more pieces of media include the one or more indicated target objects, including obtaining results from the further review and providing the received results, and wherein the one or more indicated target objects include at least one of a person or a vehicle missing in a geographical area that includes the one or more areas of interest.

15. A system comprising:
one or more hardware processors; and
one or more memories with stored instructions that, when executed by at least one of the one or more hardware processors, cause the system to perform automated operations that include at least:
obtaining information about a target identification effort to identify one or more indicated target objects in a plurality of images;
determining an amount of memory to use on one or more client computing devices that will display at least one of the plurality of images;
generating, using at least one of an amount of memory or a transmission rate, the plurality of images, including obtaining media data from one or more external sources about one or more areas of interest, and manipulating the media data to produce one or more indicated characteristics for each image of the plurality, wherein the one or more indicated characteristics includes a size of each image that is based at least in part on the determined amount of memory;
analyzing at least some images of the plurality to prioritize one or more images of the plurality for the target identification effort; and
providing, to the one or more client computing devices and over one or more computer networks, the one or more images for use in identifying the one or more indicated target objects for the target identification effort.

16. The system of claim 15 wherein the analyzing of the at least some images includes determining a likelihood for each of the at least some images that the image includes at least one of the one or more indicated target objects.

17. The system of claim 15 wherein the one or more areas of interest are a geographical area, wherein the plurality of images in aggregate represent the geographical area such that each image of the plurality represents a subset of the geographical area, and wherein the analyzing of the at least some images includes determining that the at least some images represent a selected one of multiple portions of the geographical area.

18. The system of claim 15 wherein the manipulating of the media data to produce the one or more indicated characteristics for each image of the plurality includes modifying one or more of color, brightness, contrast, sharpness or noise in each image of the plurality.

19. The system of claim 15 wherein the stored instructions further cause the system to determine, based at least in part on the analyzing, one or more additional pieces of media to acquire for further use in the target identification effort, and to transmit the one or more additional pieces of media to the one or more client computing devices.

20. The system of claim 15 wherein the stored instructions further cause the system to provide functionality of a media target identifier system, including coordinating performance of further review of the prioritized one or more images for the target identification effort to determine whether the prioritized one or more images include the one or more indicated target objects, including obtaining results from the further review and providing information related to the received results, and wherein the one or more indicated target objects include at least one of a person or a vehicle missing in a geographical area that includes the one or more areas of interest.

* * * * *